United States Patent
Ohbitsu

(10) Patent No.: US 10,284,681 B2
(45) Date of Patent: May 7, 2019

(54) DISTRIBUTION METHOD, PLAYBACK APPARATUS, AND DISTRIBUTION APPARATUS

(71) Applicant: Fujitsu Client Computing Limited, Kanagawa (JP)

(72) Inventor: Toshiro Ohbitsu, Akishima (JP)

(73) Assignee: Fujitsu Client Computing Limited, Kanagawa (JP)

( * ) Notice: Subject to any disclaimer, the term of this patent is extended or adjusted under 35 U.S.C. 154(b) by 50 days.

(21) Appl. No.: 14/614,979

(22) Filed: Feb. 5, 2015

(65) Prior Publication Data
US 2015/0264100 A1    Sep. 17, 2015

(30) Foreign Application Priority Data

Mar. 14, 2014   (JP) .................. 2014-052268

(51) Int. Cl.
*H04L 29/06*   (2006.01)
*H04L 29/08*   (2006.01)

(52) U.S. Cl.
CPC ............ *H04L 67/32* (2013.01); *H04L 65/605* (2013.01); *H04L 65/80* (2013.01)

(58) Field of Classification Search
CPC ........ H04L 67/32; H04L 65/605; H04L 65/80
USPC ....................................................... 709/219
See application file for complete search history.

(56) References Cited

U.S. PATENT DOCUMENTS

| 5,574,934 A | * | 11/1996 | Mirashrafi | ............. | G06Q 10/10 |
| | | | | | 348/E7.082 |
| 6,611,537 B1 | * | 8/2003 | Edens | ................. | H04L 12/2803 |
| | | | | | 348/E7.05 |
| 2004/0030738 A1 | * | 2/2004 | Haydock | .............. | H04N 21/235 |
| | | | | | 709/200 |

(Continued)

FOREIGN PATENT DOCUMENTS

| CN | 103535047 | 1/2014 |
| JP | 2006-41784 | 2/2006 |

(Continued)

OTHER PUBLICATIONS

JPOA—Office Action dated Sep. 19, 2017 for corresponding Japanese Application No. 2014-052268, with full machine translation.
** Reference WO2003/105421 cited in the JPOA was previously submitted in the IDS filed on Feb. 5, 2015.

(Continued)

*Primary Examiner* — Philip J Chea
*Assistant Examiner* — Wing Ma
(74) *Attorney, Agent, or Firm* — Osha Liang LLP

(57) ABSTRACT

A distribution apparatus packetizes streaming data of a variable bit rate, and distributes the resulting data to a plurality of playback apparatuses. The distributed streaming data is transferred from one playback apparatus to other one or more playback apparatuses. One playback apparatus measures the communication quality between the one playback apparatus and each of the other playback apparatuses of transfer destinations. One playback apparatus redivides the received streaming data into packets based on a playback data amount for each unit playback time in the received streaming data and on the measured communication quality and transfers the resulting streaming data.

3 Claims, 27 Drawing Sheets

(56) References Cited

U.S. PATENT DOCUMENTS

| | | | |
|---|---|---|---|
| 2004/0208120 A1* | 10/2004 | Shenoi | H04L 29/06027 370/229 |
| 2004/0235469 A1 | 11/2004 | Krug | |
| 2004/0258226 A1* | 12/2004 | Host | H04L 12/6418 379/106.01 |
| 2005/0005025 A1* | 1/2005 | Harville | H04L 29/06027 709/241 |
| 2006/0165387 A1* | 7/2006 | Itoh | H04N 9/8042 386/330 |
| 2006/0168104 A1 | 7/2006 | Shimizu et al. | |
| 2007/0116050 A1 | 5/2007 | Hibino et al. | |
| 2007/0201388 A1* | 8/2007 | Shah | H04N 19/00 370/300 |
| 2007/0255855 A1 | 11/2007 | Knapp et al. | |
| 2008/0259964 A1* | 10/2008 | Tomita | H04L 1/1838 370/501 |
| 2009/0043908 A1* | 2/2009 | Masunaga | G11B 27/105 709/231 |
| 2009/0074382 A1* | 3/2009 | Itoh | G11B 27/105 386/334 |
| 2010/0067534 A1 | 3/2010 | Shimizu et al. | |
| 2010/0287274 A1* | 11/2010 | Martinez | H04L 65/602 709/224 |
| 2010/0287296 A1* | 11/2010 | Riggert | H04L 65/608 709/231 |
| 2011/0206035 A1* | 8/2011 | Lee | H04L 12/2838 370/351 |
| 2011/0296046 A1* | 12/2011 | Arya | H04L 65/80 709/231 |
| 2012/0246335 A1* | 9/2012 | Liu | H04N 7/17336 709/232 |
| 2012/0254456 A1* | 10/2012 | Visharam | H04N 21/2343 709/231 |
| 2013/0061271 A1* | 3/2013 | Lu | H04L 12/2838 725/74 |
| 2013/0179589 A1* | 7/2013 | McCarthy | H04N 21/8456 709/231 |
| 2013/0179590 A1* | 7/2013 | McCarthy | H04N 21/8456 709/231 |
| 2014/0019633 A1* | 1/2014 | Zhang | H04L 65/601 709/231 |
| 2014/0089993 A1 | 3/2014 | Huysegems et al. | |
| 2015/0023404 A1* | 1/2015 | Li | H04L 65/4084 375/240.02 |
| 2015/0089072 A1* | 3/2015 | Phillips | H04L 43/0811 709/231 |
| 2015/0172348 A1* | 6/2015 | Lohmar | H04L 65/607 709/219 |
| 2015/0207834 A1* | 7/2015 | Zhao | H04N 21/631 709/231 |
| 2016/0149980 A1* | 5/2016 | Karthikeyan | H04L 65/4076 709/219 |

FOREIGN PATENT DOCUMENTS

| | | |
|---|---|---|
| JP | 2006-80659 | 3/2006 |
| JP | 2007-195106 | 8/2007 |
| JP | 2009-527952 | 7/2009 |
| JP | 2011-68350 | 4/2011 |
| JP | 2011-244312 | 12/2011 |
| WO | 2003/105421 | 12/2003 |

OTHER PUBLICATIONS

CNOA—Chinese Office Action dated Jun. 27, 2017 for corresponding Chinese Application No. 201510088678.4, with English translation. ** All references listed in the CNOA were previously dated Oct. 7, 2016.

CNOA—Second Notification of Office Action dated Jan. 19, 2018 for corresponding Chinese Application No. 201510088678.4, with English translation. **Reference U.S. Pat. No. 6,611,537 was previously cited on May 18, 2017.

CNOA—Chinese Office Action for corresponding Chinese Application No. 201510088678.4, dated Jul. 24, 2018, with English translation.

* cited by examiner

| GROUP INFORMATION TABLE 111 | |
|---|---|
| GROUP ID | USER ID |
| 001 | ab@ab.com |
| | ef@ef.com |
| | ig@ig.com |
| 002 | jk@jk.com |

FIG. 7

| DISTRIBUTION PATH INFORMATION TABLE | | | | | 112 |
|---|---|---|---|---|---|
| DISTRIBUTION PATH | EFFECTIVE BANDWIDTH 1 | EFFECTIVE BANDWIDTH 2 | EFFECTIVE BANDWIDTH 3 | TOTAL | |
| DISTRIBUTOR, #A, #B, #C | 50 | 40 | 30 | 120 | |
| DISTRIBUTOR, #A, #C, #B | 50 | 60 | 30 | 140 | |
| DISTRIBUTOR, #B, #A, #C | 30 | 40 | 60 | 130 | |
| DISTRIBUTOR, #B, #C, #A | 30 | 30 | 60 | 120 | |
| DISTRIBUTOR, #C, #A, #B | 10 | 60 | 40 | 110 | |
| DISTRIBUTOR, #C, #B, #A | 10 | 30 | 40 | 80 | |

PLAYBACK SECTION INFORMATION TABLE 122

| PLAYBACK SECTION | NUMBER OF UNIT SECTIONS | PLAYBACK DATA AMOUNT |
|---|---|---|
| #1 | 8 | 10 |
| #2 | 8 | 48 |
| #3 | 8 | 16 |
| ⋮ | ⋮ | ⋮ |

FIG. 10

| PLAYBACK SECTION INFORMATION TABLE | | | |
|---|---|---|---|
| PLAYBACK SECTION | NUMBER OF UNIT SECTIONS | PLAYBACK DATA AMOUNT | TRANSMITTABLE DATA AMOUNT |
| #1 | 11 | 31 | 55 |
| #2 | 9 | 32 | 45 |
| #3 | 4 | 11 | 20 |
| ⋮ | ⋮ | ⋮ | ⋮ |

| USER INFORMATION TABLE | | | | |
| --- | --- | --- | --- | --- |
| USER ID | TERMINAL ID | ADDRESS | PASSWORD | PARTICIPATION FLAG |
| ab@ab.com | #A | x. y. 1. z | ABCD | TRUE |
| ef@ef.com | #B | x. y. 2. z | EFGH | TRUE |
| ig@ig.com | #C | x. y. 3. z | IJKL | TRUE |
| jk@jk.com | #D | x. y. 4. z | LMNO | FALSE |

FIG. 13

DISTRIBUTION METHOD, PLAYBACK APPARATUS, AND DISTRIBUTION APPARATUS

CROSS-REFERENCE TO RELATED APPLICATION

This application is based upon and claims the benefit of priority of the prior Japanese Patent Application No. 2014-052268, filed on Mar. 14, 2014, the entire contents of which are incorporated herein by reference.

FIELD

The embodiments discussed herein are related to distribution methods, playback apparatuses, and distribution apparatuses.

BACKGROUND

In recent years, techniques have widely spread for distributing contents, such as video and/or audio, by streaming. The streaming is a system in which a playback apparatus plays back content data while receiving the same.

As the technique related to the streaming, the following technique has been proposed, for example. In this technique, a server selects one client as an intermediate node based on the execution throughput of each client in a group, and transmits a source packet to the selected client. The client functioning as the intermediate node transmits the received packet to another client included in the group.

The data (streaming data) distributed by streaming may be distributed in a compressed state by a Variable Bit Rate (VBR) system. The variable bit rate system is a compression system in which the data amount needed for playback per unit time varies. The variable bit rate system has an advantage that a total data amount may be suppressed while maintaining the quality of video and/or audio.

International Publication No. WO 2003-105421

A system has been contemplated, where a playback apparatus having received streaming data plays back this data and transfers the same to other one or more playback apparatuses. Such a system is suitable, for example, for a system where playback apparatuses may communicate with each other in peer-to-peer (P2P).

In such a system, even when the transmission speed on the receiving side of a playback apparatus is sufficiently high and the playback operation in the playback apparatus is normally executed, the transmission speed between the playback apparatus and a playback apparatus of a transfer destination is not always sufficiently high. When the transmission speed between the playback apparatus and a playback apparatus of a transfer destination decreases, a late distribution or drop-off of transferred data may occur and the playback operation in the playback apparatus of a transfer destination might be interrupted. In particular, if sections each having a large data amount per unit playback time continuously appear in the streaming data of a variable bit rate, there is a problem that the playback operation in a playback apparatus of a transfer destination is likely to be interrupted when the transmission speed decreases.

SUMMARY

According to an aspect, there is provided a distribution method in a distribution system, in which streaming data of a variable bit rate is packetized and distributed from a distribution apparatus to one playback apparatus among a plurality of playback apparatuses, and the distributed streaming data is transferred from the one playback apparatus to other one or more playback apparatuses among the plurality of playback apparatuses, the distribution method including: measuring, by a playback apparatus, among the plurality of playback apparatuses, which transfers the received streaming data to the other one or more playback apparatuses, a communication quality between the playback apparatus and each of the other one or more playback apparatuses of transfer destinations; and redividing, by the playback apparatus, the received streaming data into packets based on a playback data amount for each unit playback time in the received streaming data and on the measured communication quality and transferring the resulting streaming data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of a group information table;

FIG. 10 illustrates an example of a playback section information table in dividing video data;

FIG. 12 illustrates the example (continued) of the playback section information table in dividing the video data;

FIG. 13 illustrates an example of a user information table;

DESCRIPTION OF EMBODIMENTS

Figure 1:
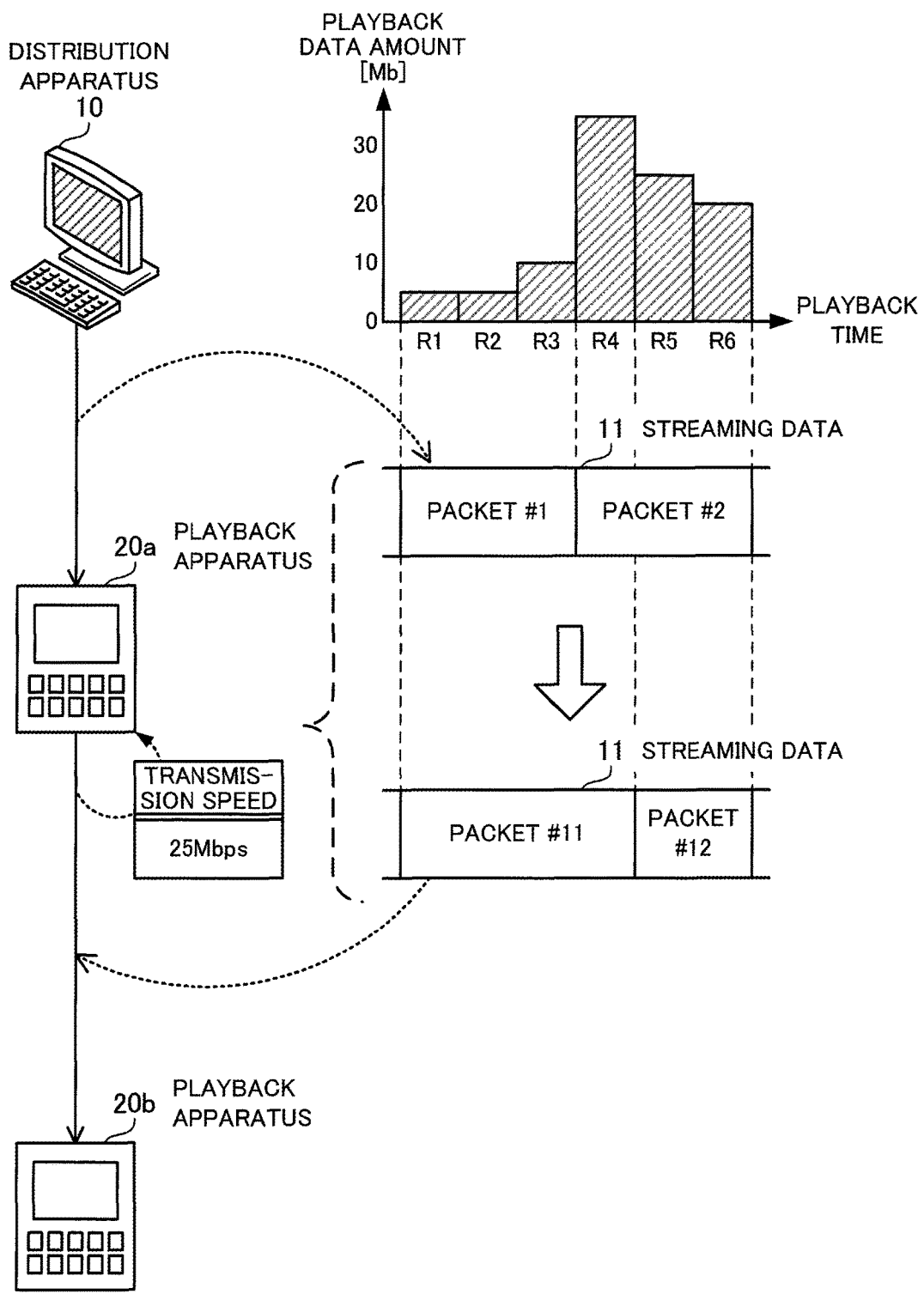
FIG. 1 illustrates a configuration example and process example of a distribution system of a first embodiment.

Several embodiments will be described below with reference to the accompanying drawings, wherein like reference numerals refer to like elements throughout.

First Embodiment

FIG. 1 illustrates a configuration example and process example of a distribution system of a first embodiment. The distribution system of the first embodiment is a system for distributing streaming data 11. The distribution system includes a distribution apparatus 10 and playback apparatuses 20a and 20b. Note that there may be three or more playback apparatuses.

The distribution apparatus 10 packetizes the streaming data 11 and distributes the resulting data. The streaming data 11 is the data of a variable bit rate, and for example may be video data or may be audio data.

The playback apparatus 20a receives the streaming data 11 distributed from the distribution apparatus 10. The playback apparatus 20a plays back the received streaming data 11 and transfers the same to the playback apparatus 20b. The playback apparatus 20b receives and plays back the streaming data 11 transferred from the playback apparatus 20a.

In this manner, in the distribution system, one playback apparatus having received the streaming data 11 transfers the streaming data 11 to other one or more playback apparatuses. Thus, the streaming data 11 is distributed to all the playback apparatuses included in the distribution system, and each playback apparatus plays back the streaming data 11.

Next, the processing in a playback apparatus, among the playback apparatuses included in the distribution system, which transfers the received streaming data 11 to another playback apparatus is described. Hereinafter, in the configuration example of FIG. 1, such a playback apparatus corresponds to the playback apparatus 20a.

The playback apparatus 20a measures the communication quality between the playback apparatus 20a and the playback apparatus 20b of a transfer destination. The examples of the communication quality include a transmission speed, RTT (Round Trip Time), and the like. The playback apparatus 20a redivides the received streaming data 11 into packets based on the playback data amount for each unit playback time in the received streaming data 11 and on the measured communication quality and transfers the resulting data. This allows the streaming data 11 to be stably played back in the playback apparatus 20b of the transfer destination.

Here, assume that the data of playback sections R1 to R3 in the streaming data 11 are stored in a packet #1 and transmitted to the playback apparatus 20a. Furthermore, assume that subsequently the data of playback sections R4 to R6 in the streaming data 11 are stored in a packet #2 and transmitted to the playback apparatus 20a.

The "playback section" is the section obtained by dividing the playback time of the streaming data 11 by each prescribed time (unit playback time). Because the streaming data 11 has a variable bit rate, the playback data amount in each playback section may fluctuate. In the example of FIG. 1, the playback data amount of each of the playback sections R1, R2, R3, R4, R5, and R6 is 5 Mb, 5 Mb, 10 Mb, 35 Mb, 25 Mb, and 20 Mb, respectively. Hereinafter, for simplicity of description, assume that the time period (unit playback time) of each playback section is one second.

Moreover, assume that the playback apparatus 20a measures the transmission speed as the communication quality between the playback apparatus 20a and the playback apparatuses 20b. Here, assume that the transmission speed between the playback apparatus 20a and the playback apparatuses 20b is measured as 25 Mbps.

Here, supposedly consider a case where the playback apparatus 20a has transferred the packets #1 and #2, as they are, to the playback apparatus 20b.

The data which takes 3 seconds to be played back is already stored in the packet #1. Moreover, a total amount of playback data included in the packet #1 is 20 Mb. Therefore, when the packet #1 is transmitted from the playback apparatus 20a at 25 Mbps, the reception of the packet #1 at the playback apparatus 20b will be completed within 3 seconds from the transmission start.

On the other hand, the data which takes 3 seconds to be played back is already stored also in the packet #2. Moreover, a total amount of playback data included in the packet #2 is 80 Mb. Therefore, when the packet #2 is transmitted from the playback apparatus 20a at 25 Mbps, the reception of the packet #2 at the playback apparatus 20b will not be completed within 3 seconds from the transmission start. In this case, reception completion of the packet #2 at the playback apparatus 20b is delayed, and data might not arrive in time by the time when the data in the packet #2 is to be played back by the playback apparatus 20b. Moreover, because the relative data amount of the packet #2 to the transmission speed is too large, the packet #2 might drop off in the middle of a transmission path. Due to such a delay in the packet reception completion and/or a drop-off of a packet, the playback of the streaming data 11 at the playback apparatus 20b might be interrupted.

Then, the playback apparatus 20a redivides the streaming data 11 into packets and transfers the resulting data. The playback apparatus 20a changes the dividing position in including at least the data included in the packet #2 into a transmission packet. In the example of FIG. 1, the data included in the packets #1 and #2 is redivided into new packets. In this case, in the streaming data 11, the data included in the packets #1 and #2 are redivided into new packets based on the playback data amount of each of the playback sections R1 to R6 and on the measured transmission speed "25 Mbps".

For example, a total amount of playback data of the playback sections R1 to R4 corresponding to four seconds of playback time is 55 Mb and is smaller than the data amount "100 Mb" that may be transmitted within four seconds at the speed of 25 Mbps. Then, the playback apparatus 20a stores the playback data of the playback sections R1 to R4 into a new packet #11 and transmits the same to the playback apparatus 20b. In this case, the reception of the packet #11 at the playback apparatus 20b is completed within four seconds after the packet #11 is transmitted from the playback apparatus 20a.

Moreover, a total amount of playback data of the playback sections R5 and R6 corresponding to two seconds of playback time is 45 Mb and is smaller than the data amount "50 Mb" that may be transmitted within two seconds at the speed of 25 Mbps. Then, the playback apparatus 20*a* stores the playback data of the playback sections R5 and R6 into a new packet #12 and transmits the same to the playback apparatus 20*b*. In this case, the reception of the packet #12 at the playback apparatus 20*b* is completed within two seconds after the packet #12 is transmitted from the playback apparatus 20*a*.

In this manner, the data stored in the packets #1 and #2 is redivided into the packets #11 and #12 and transferred, so that a margin in the buffer amount of the streaming data 11 at the playback apparatus 20*b* is more likely to be improved. Moreover, the packet is also unlikely to drop off on a transmission path. Accordingly, the playback of the streaming data 11 is unlikely to be interrupted at the playback apparatus 20*b*, thereby allowing for stable playback.

Note that, the playback apparatus 20*a* may redivide the packet only when needed, while the playback apparatus 20*a* may transfer the received packet as it is when not needed, based on the playback data amount for each unit playback time and on the measured communication quality. For example, the playback apparatus 20*a* determines whether to redivide the received packet, based on whether or not it is possible to complete the reception of the packet at a transfer destination within a playback time of the playback data stored in the packet if the packet is transferred as it is.

Moreover, the determination on whether to redivide the received packet may be simplified as follows. The playback apparatus 20*a* sets a threshold based on an indicator indicative of the communication quality between the playback apparatus 20*a* and the transfer destination. For example, the playback apparatus 20*a* sets, as the threshold, a value obtained by multiplying the transmission speed between the playback apparatus 20*a* and the transfer destination by a predetermined coefficient. Then, the playback apparatus 20*a* analyzes the data included in the received packet, and determines to redivide the received packet, when there are a predetermined number of playback sections each having a playback data amount exceeding the threshold. Thus, the processing load on the playback apparatus 20*a* is reduced.

Second Embodiment

Figure 2:
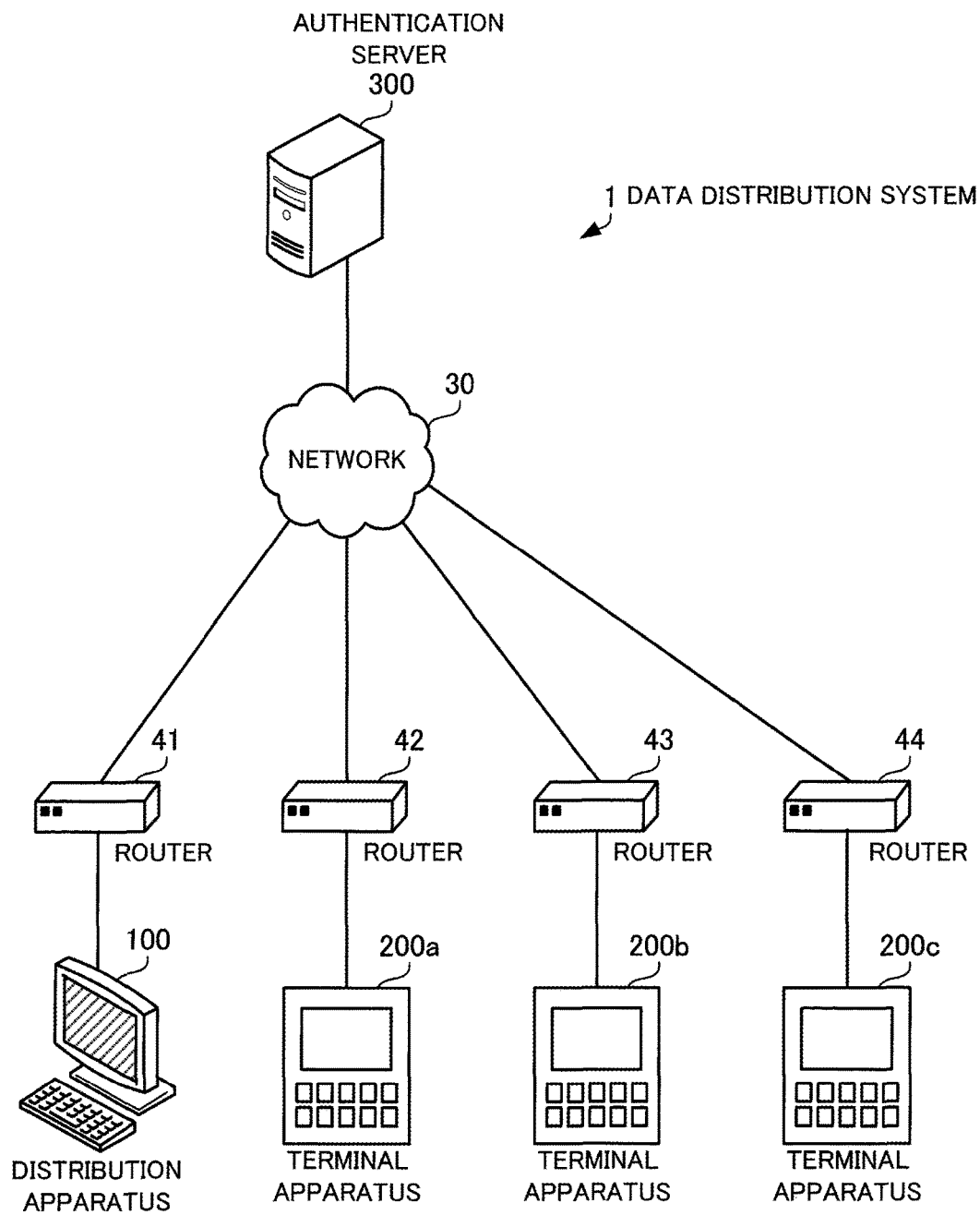
FIG. 2 illustrates an example of a data distribution system of a second embodiment.

FIG. 2 illustrates an example of a data distribution system of a second embodiment. A data distribution system 1 is a system for distributing video data to a user of the system by streaming. In the second embodiment, the data distribution system 1 is used for a learning system that utilizes e-learning (Electronic Learning), but may be applied to systems other than the learning system. The data distribution system 1 distributes a video, which is used for e-learning at a predetermined time, to a terminal apparatus by streaming. The terminal apparatus is used by a participant in e-learning of the system.

The data distribution system 1 includes a distribution apparatus 100, terminal apparatuses 200*a*, 200*b* and 200*c*, and an authentication server 300. The distribution apparatus 100 may be connected to a network 30 via a router 41, and the terminal apparatus 200*a* may be connected to the network 30 via a router 42. The terminal apparatus 200*b* may be connected to the network 30 via a router 43, and the terminal apparatus 200*c* may be connected to the network 30 via a router 44. The distribution apparatus 100, the terminal apparatuses 200*a*, 200*b* and 200*c*, and the authentication server 300 may be connected to each other via the network 30.

Note that, the distribution apparatus 100 and the terminal apparatuses 200*a*, 200*b*, and 200*c* may be connected to the network 30 via one router. Moreover, the distribution apparatus 100 is an example of the distribution apparatus 10 of the first embodiment. One of the terminal apparatuses 200*a*, 200*b*, and 200*c* is an example of the playback apparatus 20*b* of the first embodiment, and the rests are examples of the playback apparatus 20*a*.

The distribution apparatus 100 is a computer having a function to distribute a video. The examples of the distribution apparatus 100 include a desktop type computer, a notebook type computer, and the like.

The distribution apparatus 100 acquires the addresses of the terminal apparatuses 200*a*, 200*b*, and 200*c* from the authentication server 300. The distribution apparatus 100 collects the effective bandwidth between each terminal apparatus and the distribution apparatus 100 and the effective bandwidths between the terminal apparatuses. The effective bandwidth means the data amount that may be transmitted per unit time (here, one second) (i.e., the transmission speed). The distribution apparatus 100 determines a distribution path for distributing a video, based on the collected effective bandwidths. The distribution path is determined so that the terminal apparatuses are connected in a daisy chain fashion.

The distribution apparatus 100 distributes the information indicative of a distribution path to each terminal apparatus, in accordance with the determined distribution path. Thus, each terminal apparatus may recognize the distribution path. Hereinafter, the information indicative of a distribution path may be referred to as "distribution path information." Moreover, in accordance with the determined distribution path, the distribution apparatus 100 packetizes a video and distributes the resulting video to each terminal apparatus. The data length of each packet is calculated based on the effective bandwidth between the distribution apparatus 100 and the destination terminal apparatus, or the like.

The terminal apparatuses 200*a*, 200*b*, and 200*c* each have a function to play back a video. In the data distribution system 1, a portable device, such as a tablet type computer or a smart phone, is used as the terminal apparatuses 200*a*, 200*b*, and 200*c*, but a device arranged at a predetermined place, such as a desktop type computer, may be also used.

In accordance with a request from the distribution apparatus 100, the terminal apparatuses 200*a*, 200*b*, and 200*c* each measure the effective bandwidth between each terminal apparatus and each of the other terminal apparatuses and transmit the measured effective bandwidth with respect to each apparatus to the distribution apparatus 100. Note that the addresses of the other terminal apparatuses are notified to each terminal apparatus upon request from the distribution apparatus 100.

The terminal apparatuses 200*a*, 200*b*, and 200*c* each receive distribution path information. The terminal apparatuses 200*a*, 200*b*, and 200*c* each play back a video based on packetized video data while receiving the video data.

The terminal apparatuses 200*a*, 200*b*, and 200*c* are connected in a daisy chain fashion based on the distribution path information. Then, the video data that has been transmitted from the distribution apparatus 100 is transferred to the terminal apparatuses 200*a*, 200*b*, and 200*c* in a daisy chain fashion. Accordingly, among the terminal apparatuses 200*a*, 200*b*, and 200*c*, each of two terminal apparatuses except the end terminal apparatus plays back the received video data and transfers the video data to another terminal apparatus. Moreover, each of these two terminal apparatuses re-packetizes the received video data as needed and transfers the resulting video data to a terminal apparatus of a transfer destination.

The distribution apparatus 100 and the terminal apparatuses 200a, 200b, and 200c communicate with each other in a hybrid peer to peer (hybrid P2P) system using the authentication server 300. Here, the P2P system, different from a client server system, is a system, where a plurality of nodes (e.g., the distribution apparatus 100 and the terminal apparatuses 200a, 200b, and 200c) directly communicates with each other with an equal function or at an equal level. In contrast, the hybrid P2P system is a system, where although substantial data is directly transmitted and received between the nodes, a server manages the address of each node and the ID (Identification) of a user.

For example, in the hybrid P2P system, each node does not recognize the address of another node. Then, one node that performs communication acquires the address of another node by inquiring a server by specifying identification information, such as a user ID, for example. Subsequently, one node directly communicates with another node using the acquired address.

In the data distribution system 1 illustrated in FIG. 2, the authentication server 300 corresponds to the server in the hybrid P2P system, and the distribution apparatus 100 and terminal apparatuses 200a, 200b, and 200c correspond to the nodes. That is, after the distribution apparatus 100 or each of the terminal apparatuses 200a, 200b, and 200c acquires the address of a communication counterpart from the authentication server 300, image data is directly transmitted and received between the distribution apparatus 100 and each of the terminal apparatus 200a, 200b, and 200c.

The authentication server 300 manages the ID of a user and the addresses of the distribution apparatus 100 and each terminal apparatus. The authentication server 300 authenticates a user of the data distribution system 1 in accordance with a request from either of the terminal apparatuses 200a, 200b, and 200c. The authentication server 300 provides notification of the ID of an authenticated user and the address of an apparatus (e.g., terminal apparatus 200a) used by the authenticated user, in accordance with a request of the distribution apparatus 100.

Figure 3:
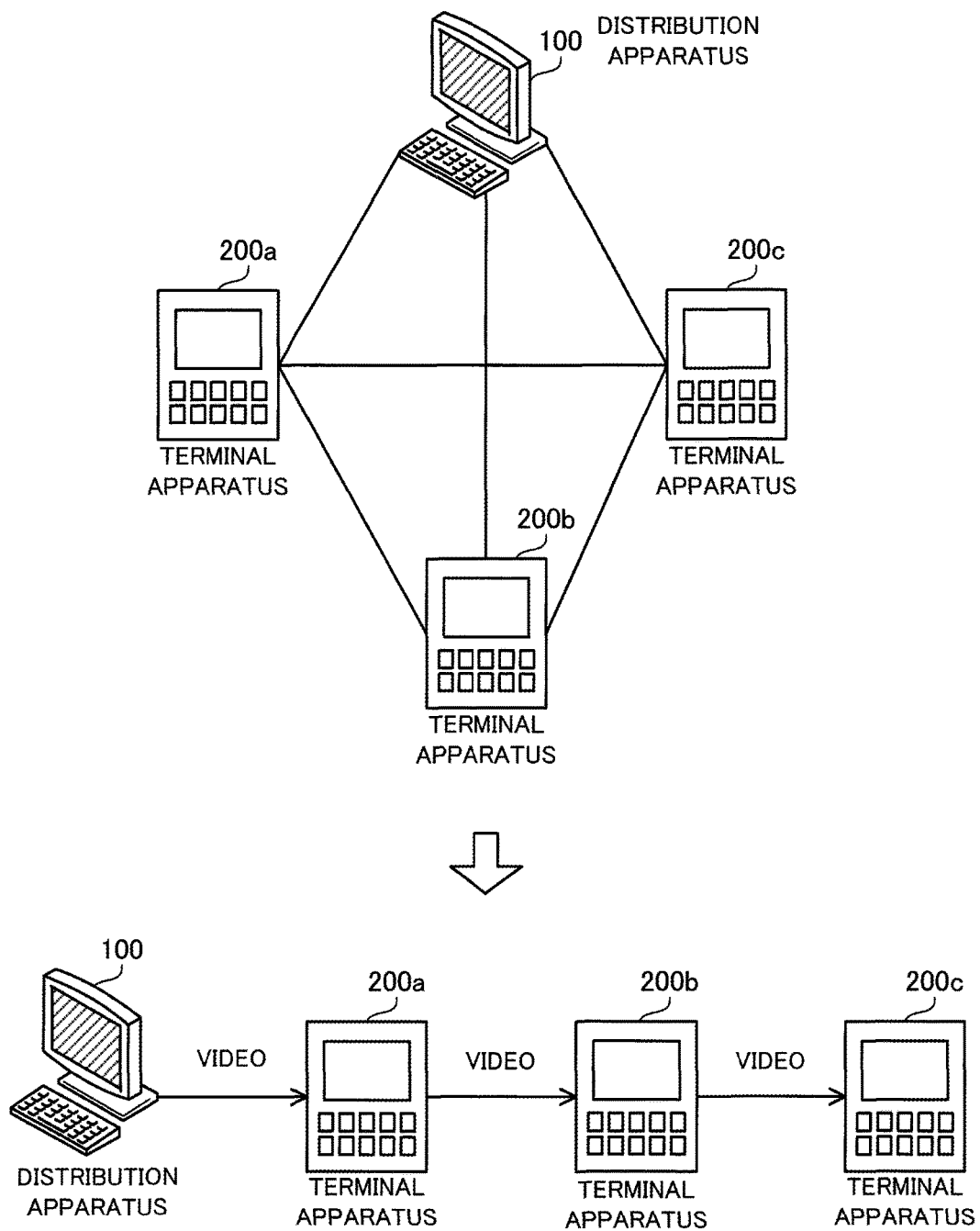
FIG. 3 illustrates an example of a distribution path of video data.

FIG. 3 illustrates an example of the distribution path of video data. In the data distribution system 1, a video is distributed from the distribution apparatus 100 to the terminal apparatuses 200a, 200b, and 200c along a distribution path connected in a daisy chain fashion.

As illustrated in the upper part of FIG. 3, the distribution apparatus 100 and the terminal apparatuses 200a, 200b, and 200c are connected to each other. Therefore, when a video is distributed from the distribution apparatus 100 to the terminal apparatuses 200a, 200b, and 200c in a daisy chain fashion, there is a plurality of distribution paths. For example, in the case of the upper part of FIG. 3, the examples of the distribution path of a video include a path going through from the distribution apparatus 100 to the terminal apparatus 200a, the terminal apparatus 200b, and the terminal apparatus 200c in this order or a path going through from the distribution apparatus 100 to the terminal apparatus 200b, the terminal apparatus 200c, and the terminal apparatus 200a in this order.

Then, the distribution apparatus 100 collects the effective bandwidth between the distribution apparatus 100 and each terminal apparatus and the effective bandwidths between the terminal apparatuses, and selects a distribution path optimum for distributing the video from a plurality of distribution paths, based on the collected effective bandwidths. Then, the distribution apparatus 100 distributes the video to each terminal apparatus along the selected distribution path.

For example, assume that a distribution path going through from the terminal apparatus 200a to the terminal apparatus 200b and the terminal apparatus 200c in this order has been selected by the distribution apparatus 100. In this case, as illustrated in the lower part of FIG. 3, the video to be distributed in the data distribution system 1 is distributed to each terminal apparatus by going through from the distribution apparatus 100 to the terminal apparatus 200a, the terminal apparatus 200b, and the terminal apparatus 200c in this order.

Since in this manner, the load due to the distribution of a video will not concentrate on a specific device by distributing a video along a distribution path connected in a daisy chain fashion, the drop-off of video data due to concentration of the load and/or the delay in arrival of video data may be suppressed. Therefore, the distribution apparatus 100 may distribute a video, in a state capable of being continuously played back, to each terminal apparatus. Moreover, determining a distribution path based on the effective bandwidths may increase the possibility to allow a video to be stably distributed to all the terminal apparatuses.

Figure 4:
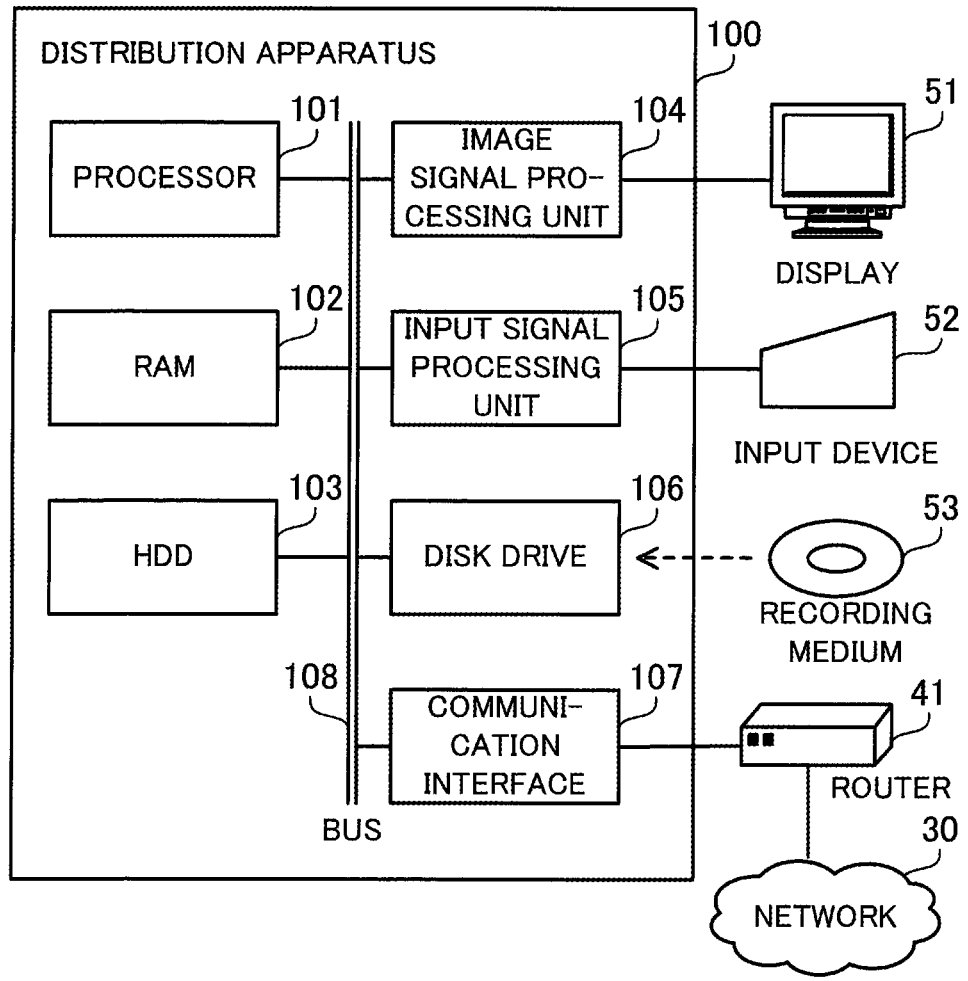
FIG. 4 illustrates a hardware configuration example of a distribution apparatus.

FIG. 4 illustrates a hardware configuration example of the distribution apparatus. The distribution apparatus 100 includes a processor 101, a RAM (Random Access Memory) 102, an HDD (Hard Disk Drive) 103, an image signal processing unit 104, an input signal processing unit 105, a disk drive 106, and a communication interface 107. These units are connected to a bus 108 inside the distribution apparatus 100.

The processor 101 includes a computing unit configured to execute instructions of a program, and is a CPU (Central Processing Unit), for example. The processor 101 loads at least a part of the program and/or data stored in the HDD 103, to the RAM 102 and executes the program. Note that the processor 101 may include a plurality of processor cores. The distribution apparatus 100 may include a plurality of processors. The distribution apparatus 100 may perform parallel processing using a plurality of processors or a plurality of processor cores. Moreover, a set of two or more processors, a dedicated circuit, such as an FPGA (Field Programmable Gate Array) or an ASIC (Application Specific Integrated Circuit), a set of two or more dedicated circuits, a combination of a processor and a dedicated circuit, and the like may be called a "processor."

The RAM 102 is a volatile memory configured to temporarily store a program executed by the processor 101 and the data referred to from programs. Note that, the distribution apparatus 100 may include a memory of a type different from a RAM, or may include a plurality of volatile memories.

The HDD 103 is a nonvolatile storage device configured to store programs and data of software, such as an OS (Operating System), firmware, and application software. Note that, the distribution apparatus 100 may include another type of storage device, such as a flash memory, or may include a plurality of nonvolatile storage devices.

The image signal processing unit 104 outputs an image to a display 51 connected to the distribution apparatus 100, in accordance with an instruction from the processor 101. A CRT (Cathode Ray Tube) display, a liquid crystal display (LCD), or the like may be used as the display 51.

The input signal processing unit 105 acquires an input signal from an input device 52 connected to the distribution apparatus 100, and notifies the processor 101 of the signal. A pointing device, such as a mouse or a touch panel, a keyboard, or the like may be used as the input device 52.

The disk drive 106 is a drive unit configured to read a program or data stored on a storage medium 53. A magnetic disk, such as a flexible disk (FD) or an HDD, an optical disc, such as a CD (Compact Disc) or a DVD (Digital Versatile Disc), or a magneto-optical disc (MO) may be used as the storage medium 53, for example. The disk drive 106 stores programs or data, which are read from the storage medium 53, into the RAM 102 or HDD 103 in accordance with an instruction from the processor 101.

The communication interface 107 communicates with another information processing apparatus (e.g., the terminal apparatus 200a or the like) via a router such as a router 41, and via a network such as the network 30.

Note that, the distribution apparatus 100 does not need to include the disk drive 106, and when controlled exclusively from another terminal apparatus, the distribution apparatus 100 does not need to include neither the image signal processing unit 104 nor the input signal processing unit 105. Moreover, the display and/or the input device 52 may be integrally formed with the housing of the distribution apparatus 100.

Note that the authentication server 300 may be also realized using the same hardware as the distribution apparatus 100.

Figure 5:
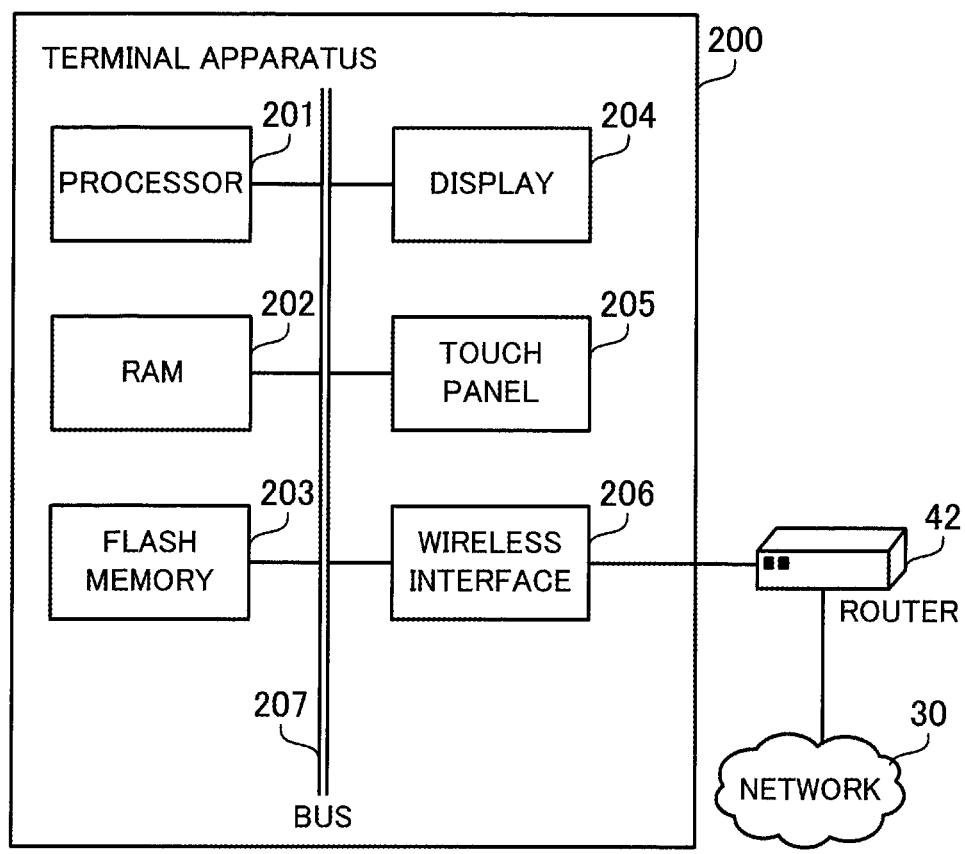
FIG. 5 illustrates a hardware configuration example of a terminal apparatus.

FIG. 5 illustrates a hardware configuration example of the terminal apparatus. Note that, because the terminal apparatuses 200a, 200b, and 200c have the same hardware configuration, respectively, these apparatuses are represented by a "terminal apparatus 200" in FIG. 5. Hereinafter, when the terminal apparatuses 200a, 200b, and 200c are described with no distinction, the expression "terminal apparatus 200" will be used.

The terminal apparatus 200 includes a processor 201, a RAM 202, a flash memory 203, a display 204, a touch panel 205, and a wireless interface 206. These units are connected to a bus 207 inside the terminal apparatus 200.

The processor 201 is a processor including a computing unit configured to execute an instruction of a program, as with the above-described processor 101. The RAM 202 is a volatile memory configured to temporarily store a program executed by the processor 201 and data, as with the above-described RAM 102.

The flash memory 203 is a nonvolatile storage device configured to store programs and data of an OS, firmware, application software, and the like. Note that, the terminal apparatus 200 may include another type of storage device, such as an HDD, or may include a plurality of nonvolatile storage devices.

The display 204 displays an image in accordance with an instruction from the processor 201. A liquid crystal display, an organic EL (Electro Luminescence) display, or the like may be used as the display 204.

The touch panel 205 is superposed on the display 204, detects a touch operation of a user with respect to the display 204, and notifies the processor 201 of a touch position as an input signal. A pointing device, such as a touch pen, or a finger of a user is used for the touch operation. The examples of the method for detecting a touch position include various detection methods, for example such as a matrix switch method, a resistive film method, a surface acoustic wave method, an infrared method, an electromagnetic induction method, and a capacitive sensing method, and either method may be employed. Note that, the terminal apparatus 200 may include another type of input device, such as a keypad with a plurality of input keys.

The wireless interface 206 is a communication interface configured to perform wireless communications. The wireless interface 206 performs the demodulation and decoding of a received signal, the encoding and modulation of a transmission signal, and the like. For example, the wireless interface 206 connects to the network 30 or the like via a router such as the router 42. The terminal apparatus 200 may include a plurality of wireless interfaces.

Note that a program executed by the processor 201 may be copied to the flash memory 203 from another storage device. Moreover, a program executed by the processor 201 may be downloaded from the network 30 or the like by the wireless interface 206.

Figure 6:
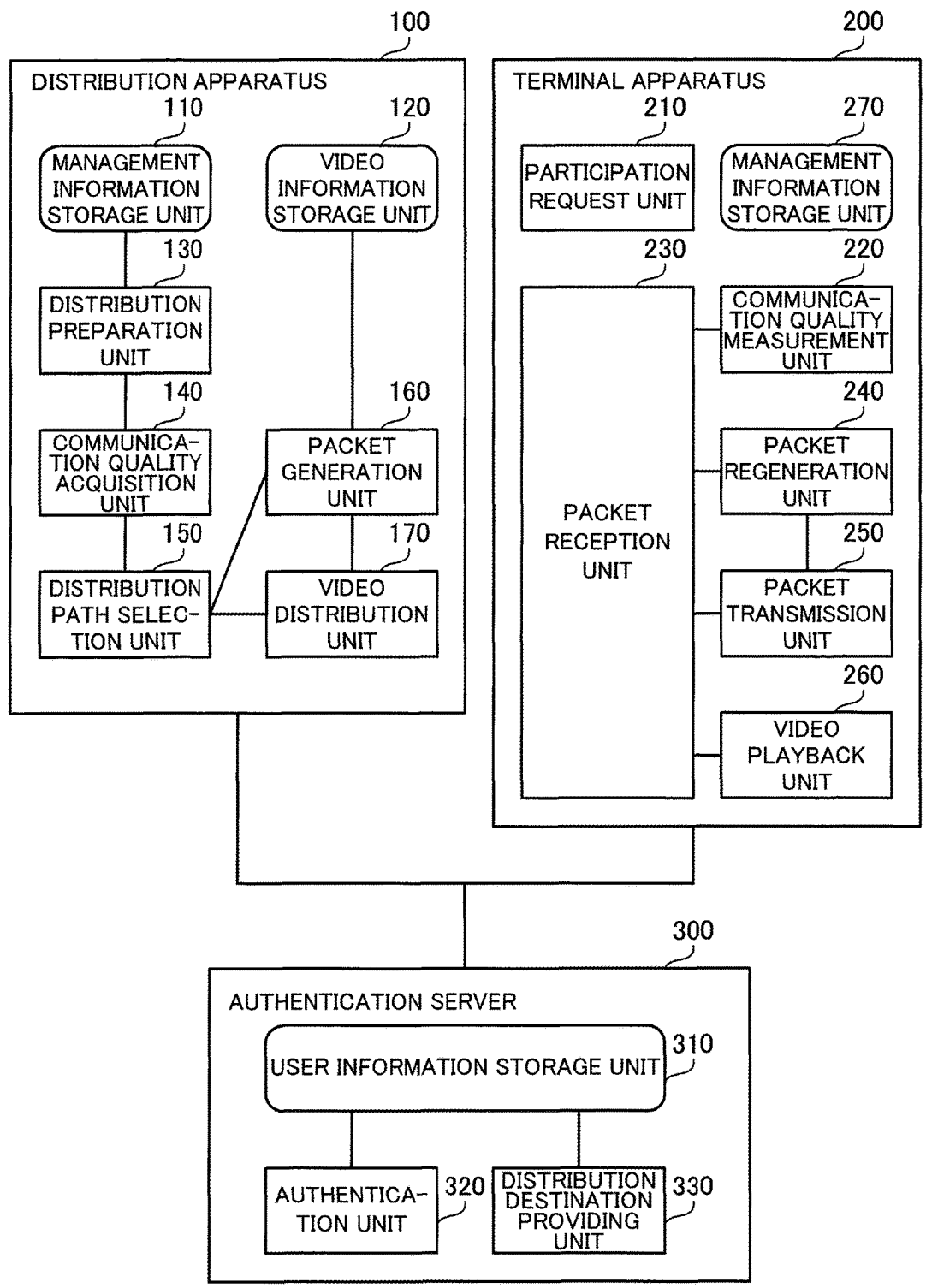
FIG. 6 illustrates a functional example of the distribution apparatus, the terminal apparatus, and an authentication server.

FIG. 6 illustrates a functional example of the distribution apparatus, terminal apparatus, and authentication server. The distribution apparatus 100 includes a management information storage unit 110, a video information storage unit 120, a distribution preparation unit 130, a communication quality acquisition unit 140, a distribution path selection unit 150, a packet generation unit 160, and a video distribution unit 170. The management information storage unit 110 and the video information storage unit 120 may be realized as a storage area secured in the RAM 102 or HDD 103. The processor 101 included in the distribution apparatus 100 may execute a predetermined program, thereby realizing the processing of each of the distribution preparation unit 130, the communication quality acquisition unit 140, the distribution path selection unit 150, the packet generation unit 160, and the video distribution unit 170, for example.

The management information storage unit 110 stores a group information table, in which the information about a group of users (a user group) of the data distribution system 1 is stored in advance. Moreover, the management information storage unit 110 stores a distribution path information table having the information about the selectable distribution paths stored therein.

The video information storage unit 120 stores one or two or more pieces of video data in advance, which the distribution apparatus 100 may distribute. The video data stored in the video information storage unit 120 is the data that is compressed and encoded at a variable bit rate. Moreover, the video information storage unit 120 temporarily stores video analysis information indicative of the analysis result of video data. Furthermore, the video information storage unit 120 stores a playback section information table, which temporarily stores the information about the playback section at the time when the video data is divided for each playback section. The playback section indicates each divided section in dividing video data based on a playback time, and the video data included in one playback section is stored in one packet.

The distribution apparatus 100 is not able to directly transmit data because it does not recognize the address of a terminal apparatus serving as the distribution destination of a video. Then, the distribution preparation unit 130 acquires the address of a terminal apparatus serving as the distribution destination by using a function described below, so that the distribution apparatus 100 may directly transmit data to the terminal apparatus of the distribution destination.

The distribution preparation unit 130 transmits a participation confirmation request to the authentication server 300. The participation confirmation request includes the ID of a user belonging to a user group allowed to participate in e-learning. An administrator of the distribution apparatus 100 may select this user group by an input operation or the like, or the distribution preparation unit 130 or the like may search a group corresponding to a video to be distributed. The ID of a user is associated with a user group and registered into the group information table.

The distribution preparation unit 130 receives a confirmation result notification from the authentication server 300. The confirmation result notification includes the ID of a user (participant) participating in e-learning. The ID of a user participating in e-learning is the ID of a user participating in e-learning among the users included in the participation confirmation request.

Moreover, the distribution preparation unit 130 specifies the ID of a user included in the confirmation result notification, and transmits an address request to the authentication server 300. The distribution preparation unit 130 receives an address notification from the authentication server 300. The address notification includes the address of a terminal apparatus of the distribution destination of a video. The terminal apparatus of the distribution destination of the video is used by a user included in the address request. By receiving the address notification, the distribution apparatus 100 may directly transmit data to a terminal apparatus used by a user participating in e-learning.

The communication quality acquisition unit 140 transmits a communication quality request to each terminal apparatus to which the transmission of data has been enabled by the processing of the distribution preparation unit 130. The communication quality request is a notification for requesting a destination terminal apparatus for the effective bandwidth between the destination terminal apparatus and each terminal apparatus. In this case, the communication quality request includes the address of the terminal apparatus of each distribution destination acquired by the distribution preparation unit 130.

The communication quality acquisition unit 140 receives a communication quality notification from each terminal apparatus to which the communication quality request was transmitted. The communication quality notification includes the effective bandwidth between a terminal apparatus of the transmission source of the communication quality notification and each of the other terminal apparatuses. The communication quality acquisition unit 140 registers the received effective bandwidth into the distribution path information table.

In addition, the communication quality acquisition unit 140 measures the effective bandwidth between the distribution apparatus 100 and each terminal apparatus to which the transmission of data has been enabled by the distribution preparation unit 130, and registers the measured effective bandwidth into the distribution path information table.

The distribution path selection unit 150 selects one distribution path from a plurality of distribution path candidates based on the effective bandwidths registered in the distribution path information table. The plurality of distribution path candidates is registered in the distribution path information table in advance.

The packet generation unit 160 selects a video to be distributed from the video information storage unit 120. The examples of the method for selecting a video include a method for causing an administrator of the distribution apparatus 100 to select a video to be distributed from a screen displayed on the display 51, or a method for storing information about a stored video to be distributed in the distribution apparatus 100 in advance, and selecting, by the packet generation unit 160, the video to be distributed based on the stored information. Assume that, in the data distribution system 1, a video to be distributed is selected by the former method.

The packet generation unit 160 analyzes the data of the selected video to generate video analysis information, and determines each playback section at the time of dividing the video, based on the effective bandwidth between the distribution apparatus 100 and the destination terminal apparatus and on the video analysis information. The packet generation unit 160 divides the video to be distributed in accordance with the determined playback sections. The packet generation unit 160 generates a packet for each divided video data. In this case, the packet generation unit 160 causes a packet, which includes the video data divided for a playback section having the smallest playback time, to include the distribution path information selected by the distribution path selection unit 150.

The video distribution unit 170 transmits each packet generated by the packet generation unit 160 to the destination terminal apparatus. In this case, the video distribution unit 170 transmits packets in order from a packet including the video data having the smaller playback time. Moreover, the second and subsequent packets are transmitted when there is a request for a packet from the terminal apparatus 200.

The terminal apparatus 200 includes a participation request unit 210, a communication quality measurement unit 220, a packet reception unit 230, a packet regeneration unit 240, a packet transmission unit 250, a video playback unit 260, and a management information storage unit 270. The processor 201 included in the terminal apparatus 200 may execute a predetermined program, thereby realizing the processing of each of the participation request unit 210, the communication quality measurement unit 220, the packet reception unit 230, the packet regeneration unit 240, the packet transmission unit 250, and the video playback unit 260.

The participation request unit 210 transmits a participation request to the authentication server 300. The participation request includes the ID and password of a user. The participation request unit 210 receives a result of authentication performed by the authentication server 300.

The communication quality measurement unit 220 receives a communication quality request from the distribution apparatus 100. The communication quality measurement unit 220 measures the effective bandwidth between the terminal apparatus 200 and each of the other terminal apparatuses in accordance with the communication quality request from the distribution apparatus 100. The communication quality measurement unit 220 transmits a communication quality notification including the measured effective bandwidths to the distribution apparatus 100.

The packet reception unit 230 receives packetized video data from the distribution apparatus 100 or another terminal apparatus. The packet to be firstly received includes distribution path information. The packet reception unit 230 stores the video data included in a packet whose reception is completed, in a decoder buffer. When video data is transferred, the packet reception unit 230 stores the received packet in a transmission buffer. As described later, a packet is regenerated as needed on the transmission buffer. These buffer areas are the storage areas secured in a storage device (e.g., the RAM 202) included in the terminal apparatus 200.

In receiving the second and subsequent packets, the packet reception unit 230 confirms the data accumulation amount on the decoder buffer, and transmits a packet request to the distribution apparatus 100 when the data accumulation amount is less than a threshold. Then, the second and subsequent packets are received from the distribution apparatus 100 in accordance with the packet request.

The packet regeneration unit 240 analyzes the received video data and calculates the data amount for each unit playback time. The calculated data amount is registered into the video analysis information of the management information storage unit 270. The packet regeneration unit 240 re-packetizes the video data as needed, based on the effective bandwidth between the terminal apparatus 200 and a terminal apparatus of a transfer destination of video data and on the data amount for each unit playback time. The terminal apparatus of a transfer destination may be acquired based on the distribution path information received by the packet reception unit 230. The effective bandwidth between the terminal apparatus 200 and the terminal apparatus of a transfer destination may be acquired based on the acquired destination terminal apparatus and on the effective bandwidth measured by the communication quality measurement unit 220.

The packet transmission unit 250 transmits the packetized video data to the terminal apparatus of a transfer destination. The received packet not to be regenerated by the packet regeneration unit 240 is transmitted as it is, with only header information, such as the destination address, being rewritten. Moreover, the video data of the received packet to be regenerated by the packet regeneration unit 240 is stored in the regenerated packet and transmitted.

The video playback unit 260 plays back a video by performing expansion and decode processing on the video data stored in a decoder buffer by the packet reception unit 230.

The management information storage unit 270 is realized, for example, by a storage device (e.g., RAM 202) included in the terminal apparatus 200. The management information storage unit 270 stores the video analysis information having stored therein the data amount for each unit playback time.

The authentication server 300 includes a user information storage unit 310, an authentication unit 320, and a distribution destination providing unit 330. The user information storage unit 310 may be realized as a storage area secured in a storage device, such as the RAM or HDD included in the authentication server 300. A processor included in the authentication server 300 may execute a predetermined program, thereby realizing the processing of each of the authentication unit 320 and the distribution destination providing unit 330, for example.

The user information storage unit 310 stores a user information table, in which the information about users of the data distribution system 1 is stored in advance.

The authentication unit 320 receives a participation request from the terminal apparatus 200. The participation request includes the ID and password of a user. The authentication unit 320 authenticates the user using the received ID and password of the user. When succeeded in authentication, the authentication unit 320 registers this fact into the user information table. The authentication unit 320 notifies the terminal apparatus which transmitted the participation request of the authentication result. A successfully authenticated user is recognized as a participant by the authentication server 300.

The distribution destination providing unit 330 receives a participation confirmation request from the distribution apparatus 100. The authentication unit 320 transmits a confirmation result notification to the distribution apparatus 100. The confirmation result notification includes the ID of an authenticated user (i.e., participant) among the users included in the received participation confirmation request. Whether or not a user has been authenticated may be determined by referring to the user information table.

Moreover, the distribution destination providing unit 330 receives an address request from the distribution apparatus 100. The distribution destination providing unit 330 transmits an address notification to the distribution apparatus 100. The address notification includes the address of a terminal apparatus of a participant included in each address request. The address of a terminal apparatus may be acquired from the user information table based on the ID of each authenticated user.

Next, the table and data used by the data distribution system 1 are described using FIGS. 7 to 17. First, the table used by the distribution apparatus 100 is described using FIGS. 7 to 12. Specifically, first, in FIG. 7, there is described the group information table, and next in FIG. 8, there is described a method for determining the distribution path of a video to be distributed using the distribution path information table. Then, in FIGS. 9 to 12, there is described a method for dividing, by the distribution apparatus 100, a video using the video analysis information and the playback section information table.

FIG. 7 illustrates an example of the group information table. A group information table 111 stores in advance the information about user groups of the data distribution system 1. The group information table 111 is stored in advance in the management information storage unit 110.

The group information table 111 includes the items of group ID and user ID. An identifier for identifying a user group of the data distribution system 1 is set to the item of group ID. An identifier for identifying a user of the data distribution system 1 belonging to a group is set to the user ID.

Figure 8:
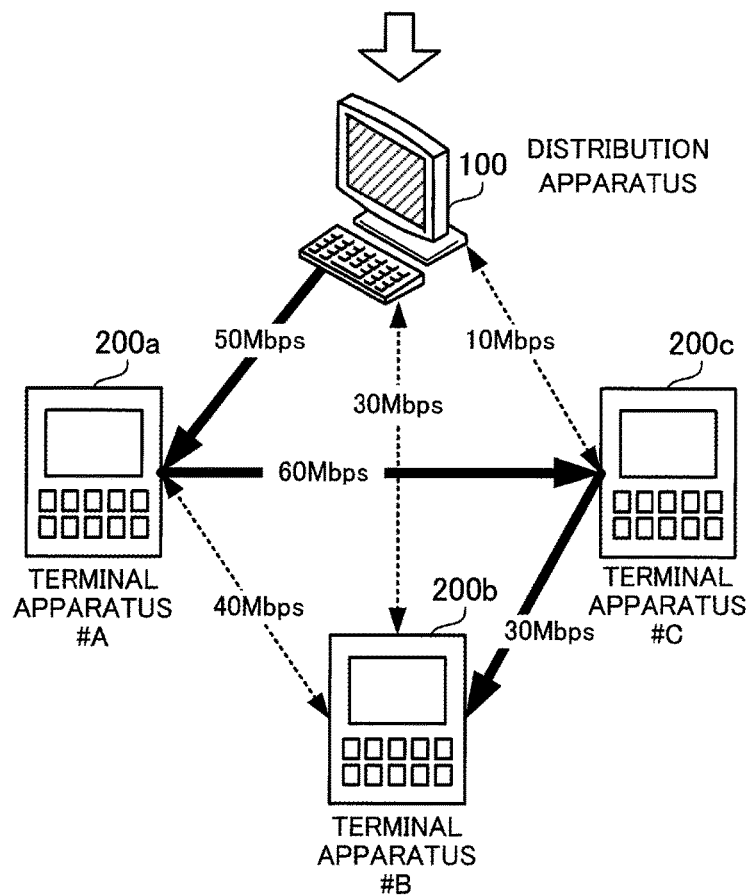
FIG. 8 illustrates an example of selecting a path using a distribution path information table.

FIG. 8 illustrates an example of selecting a path using the distribution path information table. In FIG. 8, assume that the identifier of the distribution apparatus 100 is "distributor", the identifier of a terminal apparatus 200*a* is "#A", the identifier of a terminal apparatus 200*b* is "#B", and the identifier of a terminal apparatus 200*c* is "#C".

A distribution path information table 112 stores information about a connection pattern (i.e., about a distribution path candidate) when the terminal apparatuses 200*a*, 200*b*, and 200*c* are connected in a daisy chain fashion. The distribution path information table 112 is used when the distribution apparatus 100 selects one distribution path from a plurality of distribution path candidates. The distribution path information table 112 is stored in advance in the management information storage unit 110.

The distribution path information table 112 includes items of distribution path, effective bandwidth 1, effective bandwidth 2, effective bandwidth 3, and total.

Information indicative of a distribution path candidate of a video is set to the item of distribution path. For example, when a distribution path going through from the distribution apparatus 100, to the terminal apparatuses 200*a*, 200*b*, and 200*c* in this order is indicated, "distributor, #A, #B, #C" is set to the item of distribution path.

Information indicative of the effective bandwidth between a terminal apparatus of the first transmission destination in the corresponding distribution path and an apparatus of the transmission source of the terminal apparatus is set to the effective bandwidth 1. Information indicative of the effective bandwidth between a terminal apparatus of the second transmission destination in the corresponding distribution path and an apparatus of the transmission source of the terminal apparatus is set to the effective bandwidth 2. Information indicative of the effective bandwidth between a terminal apparatus of the third transmission destination in the corresponding distribution path and an apparatus of the transmission source of the terminal apparatus is set to the effective bandwidth 3.

For example, if "distributor, #A, #B, #C" is already set to the item of distribution path, then information indicative of the effective bandwidth between the distribution apparatus 100 and the terminal apparatus 200*a* measured by the distribution apparatus 100 is set to the effective bandwidth 1. In a similar case, information indicative of the effective bandwidth between the terminal apparatus 200*a* and the terminal apparatus 200*b* measured by the terminal apparatus 200*a* is set to the effective bandwidth 2, and information indicative of the effective bandwidth between the terminal apparatus 200*b* and the terminal apparatus 200*c* measured by the terminal apparatus 200*b* is set to the effective bandwidth 3. Note that, the unit of the value registered in each of the effective bandwidth 1, effective bandwidth 2, and effective bandwidth 3 is assumed to be "Mbps".

Information indicative of a total value of the effective bandwidth 1, effective bandwidth 2, and effective bandwidth 3 is set to the item of total. In selecting one distribution path from a plurality of distribution path candidates, the distribution apparatus 100 selects a distribution path having the largest value set in the item of total.

For example, assume that the distribution path information table 112 as illustrated in the upper part of FIG. 8 is already stored in the management information storage unit 110. Among the total values registered in the distribution path information table 112, the largest value is "140". Therefore, "distributor, #A, #C, #B" indicated in the item of distribution path of a record having the total of "140" is determined as the distribution path of a video to be distributed. In this case, as illustrated in the lower part of FIG. 8, the video data is distributed going through from the distribution apparatus 100 to the terminal apparatus 200*a*, 200*c*, and 200*b* in this order. This reduces a risk of drop-off of a packet including the divided video data and a risk of delay in the arrival of a packet, and therefore all the terminal apparatuses of distribution destinations are more likely to be able to continuously playback a video.

Note that, the distribution apparatus 100 may exclude a distribution path in which an effective bandwidth falling below a predetermined value is registered in at least one of the items of effective bandwidth 1, effective bandwidth 2, and effective bandwidth 3, from the distribution path candidates. Moreover, when there is a plurality of distribution paths whose total value of the effective bandwidths is the largest, a communication distribution path may be selected in which the minimum of the values registered in the items of effective bandwidth 1, effective bandwidth 2, and effective bandwidth 3 is the largest.

Furthermore, the distribution apparatus 100 may select a distribution path by a method described below, other than the above-described method. First, the distribution apparatus 100 selects a distribution path whose effective bandwidth 1 is the largest. When there is a plurality of distribution paths whose effective bandwidth 1 is the largest, the distribution apparatus 100 selects a distribution path whose effective bandwidth 2 is the largest. Furthermore, when there is a plurality of distribution paths whose effective bandwidth 2 is the largest, the distribution apparatus 100 selects a distribution path whose effective bandwidth 3 is the largest.

Figure 9:
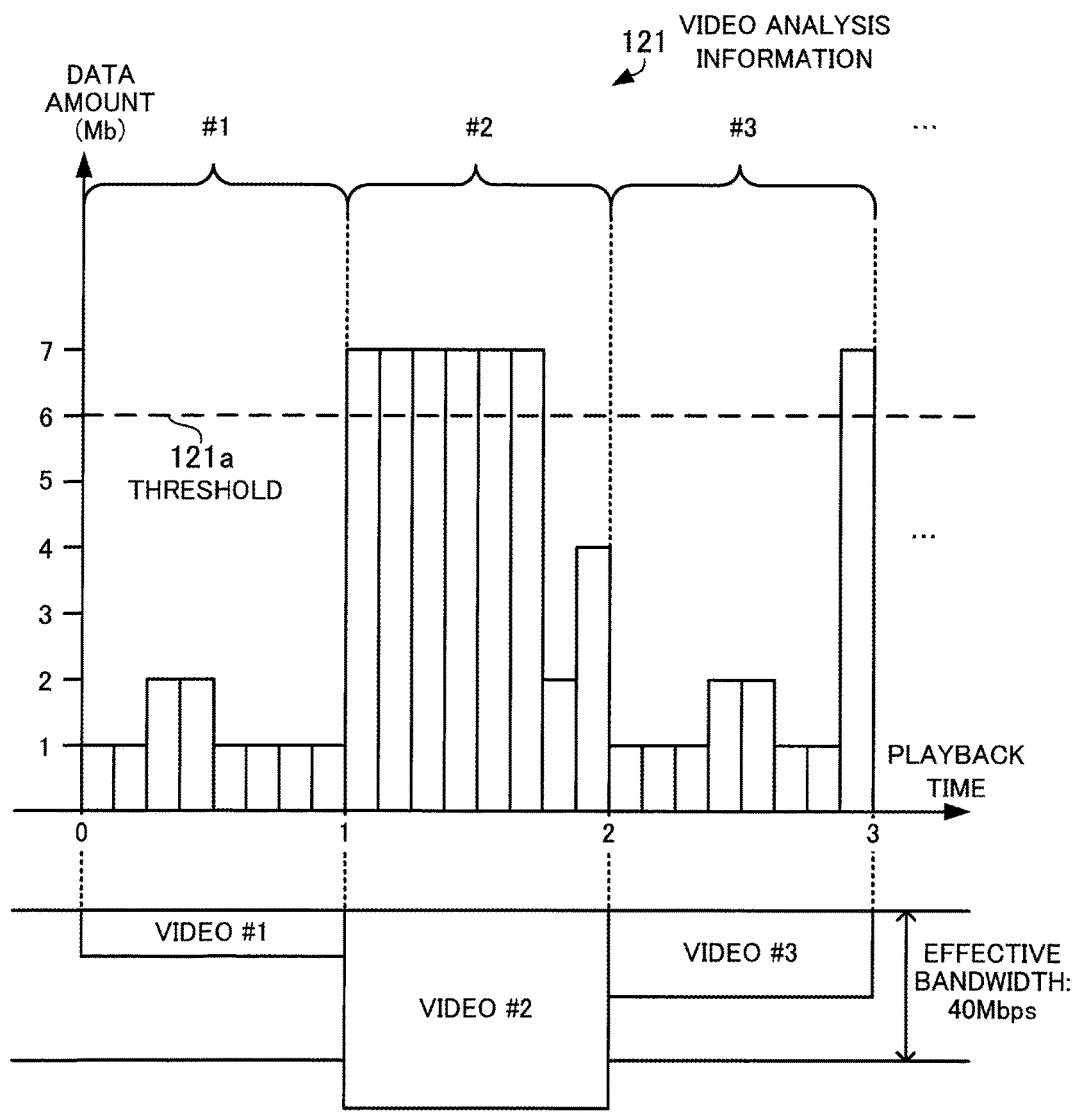
FIG. 9 illustrates an example of video analysis information in dividing video data.

FIG. 9 illustrates an example of the video analysis information in dividing video data, and FIG. 10 illustrates an example of the playback section information table in dividing the video data.

Video analysis information 121 is the information indicating an analysis result of the video data to be distributed. The video analysis information 121 is obtained by dividing video data into sections for each prescribed playback time and recording the data amount (playback data amount) needed for playback for each divided section. Hereinafter, the section divided as described above may be referred to as a "unit section", and the playback time of the unit section may be referred to as a "unit playback time." Hereinafter, as an example, the unit playback time is assumed to be ⅛ second. The data distribution system 1 divides video data, with the unit section as the minimum unit, to generate packets. Hereinafter, the playback data of a unit section may be referred to as a "unit section data."

The video analysis information 121 is temporarily stored in the video information storage unit 120. The actual video analysis information 121 is realized, for example, as table information in which the playback data amount is associated with each unit section. In FIG. 9, the information recorded in such table information is graphically illustrated. In the video analysis information 121 of FIG. 9, the horizontal axis represents the playback time and the vertical axis represents the data amount. For example, for a video corresponding to the video analysis information 121 of FIG. 9, the data amount of unit section data in the unit section from 0 second to ⅛ second is "1 Mb."

A playback section information table 122 illustrated in FIG. 10 temporarily stores the information about the playback section at the time when video data is divided for each playback section. The playback section information table 122 is used when the dividing position of each playback section in video data is calculated and/or when the playback data of each playback section is stored in a packet.

The playback section information table 122 includes the items of playback section, number of unit sections, and playback data amount. An identifier for identifying a playback section is set to the item of playback section. As previously described, the playback section indicates each dividing section in dividing video data based on a playback time. The playback section is set in order from the head of video image data. The number of unit sections included in a playback section is set to the item of number of unit sections. The information indicative of the playback data amount of a playback section is set to the item of playback data amount. That is, a total amount of data of the unit section data included in the playback section is set to the item of playback data amount.

Here is described a method for dividing the video data to be distributed using the video analysis information 121 and the playback section information table 122.

First, the distribution apparatus 100 divides, as an initial setting, video data into playback sections each having a prescribed playback time interval, calculates the information about each divided playback section, and registers the same into the playback section information table 122. Hereinafter, assume that at the time of initial setting, the length of a playback section is set to one second. The information about each playback section includes the number of unit sections included in a playback section and the playback data amount of a playback section.

For example, when dividing the video data corresponding to the video analysis information 121 illustrated in the upper part of FIG. 9, first the distribution apparatus 100 divides a video to be distributed into a playback section #1 from "zero to one second", a playback section #2 from "one to two seconds", and a playback section #3 from "two to three seconds."

Next, the distribution apparatus 100 calculates the information about the playback sections #1, #2, and #3 each divided at one second interval, and registers the information into the playback section information table 122. As illustrated in the video analysis information 121 of FIG. 9, the playback sections #1, #2, and #3 each include eight unit sections. A total of unit section data included in the playback section #1 (i.e., the playback data amount of the playback section #1) is "1+1+2+2+1+1+1+1=10 (Mb)." Similarly, the playback data amount of the playback section #2 is "7+7+7+7+7+7+2+4=48 (Mb)", and the playback data amount of the playback section #3 is "1+1+1+2+2+1+1+7=16 (Mb)."

Therefore, as illustrated in the playback section information table 122 of FIG. 10, "8" is registered into the items of number of unit sections corresponding to the playback sections #1, #2, and #3, respectively. Moreover, "10" is registered into the item of playback data amount corresponding to the playback section #1, "48" is registered into the item of playback data amount corresponding to the playback section #2, and "16" is registered into the item of playback data amount corresponding to the playback section #3. Note that, the area of each block of the "video #1", the "video #2", and the "video #3" illustrated in the lower part of FIG. 9 schematically illustrates the playback data amount in the playback sections #1, #2, and #3, respectively. The height of each block schematically illustrates the minimum value of the speed when the data of a corresponding playback section is stored in one packet and transmitted at a constant speed.

Next, the distribution apparatus 100 determines a playback section to be adjusted for a section. Specifically, first, the distribution apparatus 100 searches a playback section in which two or more pieces of unit section data each having data amount exceeding a threshold 121a continue, based on the video analysis information 121. Next, the distribution apparatus 100 determines the searched playback section and the playback sections before and after the searched playback section, as the playback sections to be adjusted.

The threshold 121a is set based on the effective bandwidth between the distribution apparatus 100 and the destination terminal apparatus. For example, the threshold 121a is calculated by multiplying the effective bandwidth by (1/unit playback time) and a correction value. When the playback data of a playback section is stored in one packet and transmitted, the threshold 121a serves as a value to simply determine whether the playback operation in the destination terminal apparatus might be interrupted due to the late distribution and/or drop-off of the packet.

For example, if the threshold 121a is "6 Mb", then in the case of the upper part of FIG. 9, first the playback section #2 is searched as a playback section in which two or more pieces of unit section data each having data amount exceeding "6 Mb" continue. Then, the searched playback section #2 and the playback sections #1 and #3 before and after the playback section #2 are determined as the playback sections to be adjusted.

Note that, the distribution apparatus 100 may determine, when the data amount of a playback section exceeds the data amount that may be transmitted within the playback time of the playback section, the playback section and playback sections before and after the playback section as the playback sections to be adjusted, instead of using the above-described method. The playback data amount that may be transmitted within the playback time of a playback section is calculated by the calculation formula: "effective bandwidth between the distribution apparatus 100 and the destination terminal apparatus×number of unit sections×unit playback time." If the effective bandwidth between the distribution apparatus 100 and the destination terminal apparatus is "40 Mbps" and the playback time of each playback section is one second, then the data amount that may be transmitted within the playback time (i.e., one second) is "40×8×(⅛)=40 (Mb)."

In the example of FIG. 9, the playback data amount of the playback section #2 is "48 Mb" and exceeds the data amount "40 Mb" that may be transmitted within the playback time. In this case, the playback section #2 and the playback sections #1 and #3 before and after the playback section #2 are determined as the playback sections to be adjusted.

As described above, when it is determined whether to adjust a playback section, based on whether the data amount of a playback section exceeds the data amount that may be transmitted within the playback time of the playback section, the playback section to be adjusted may be accurately determined as compared with the determination using the threshold 121a. In contrast, the processing load increases as compared with the determination using the threshold 121a.

Moreover, these two determination methods may be combined. Specifically, the distribution apparatus 100 searches a playback section in which a predetermined number of or more pieces of unit section data each having the data amount exceeding the threshold 121a continue. Next, the distribution apparatus 100 determines whether the data amount of the searched playback section exceeds the data amount that may be transmitted within the playback time of the playback section, and then if it exceeds, the distribution apparatus 100 determines the playback section and the playback sections before and after the playback section as the playback sections to be adjusted. Thus, the playback section to be adjusted may be accurately determined and the processing load may be reduced.

Figure 11:
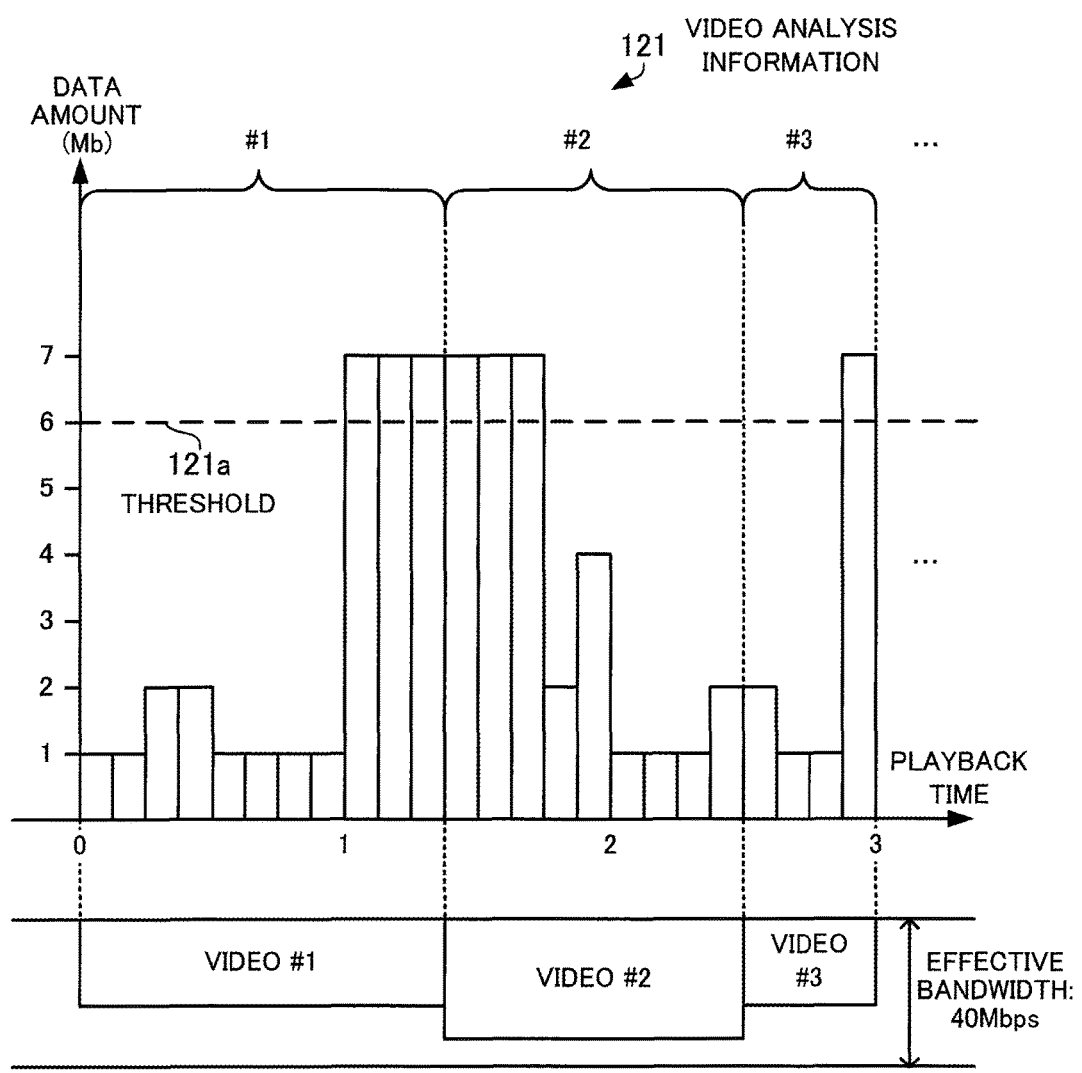
FIG. 11 illustrates the example (continued) of the playback section information table in dividing the video data.

FIG. 11 illustrates the example (continued) of the video analysis information in dividing the video data, and FIG. 12 illustrates the example (continued) of the playback section information table in dividing the video data.

Next, the distribution apparatus 100 adjusts each playback section determined to be adjusted so that the playback data amount of the playback section does not exceed the data amount that may be transmitted within the playback time of the playback section. Then, the distribution apparatus 100 calculates the information about each adjusted playback section, and updates the playback section information table 122 with the calculated information about each playback section.

For example, assume that as illustrated in the upper part of FIG. 11, each playback section is adjusted so that the playback section #1 is from "0 to 1.3 seconds", the playback section #2 is from "1.3 to 2.5 seconds", and the playback section #3 is from "2.5 to 3 seconds."

In this case, as illustrated in a playback section information table 122 of FIG. 12, in the playback section #1 the number of unit sections is "11" and the playback data amount is "31 Mb." In the playback section #2, the number of unit sections is "9" and the playback data amount is "32 Mb." In the playback section #3, the number of unit sections is "4" and the playback data amount is "11 Mb."

Moreover, as illustrated on the right of FIG. 12, in the playback section #1 the data amount that may be transmitted within the playback time is "40×11×(⅛)=55 (Mb)." In the playback section #2, the data amount that may be transmitted within the playback time is "40×9×(⅛)=45 (Mb)." In the playback section #3, the data amount that may be transmitted within the playback time is "40×4×(⅛)=20 (Mb)."

Here, as illustrated in the playback section information table 122 of FIG. 10, the playback data amount of the playback section #2 before adjustment is "48 Mb", and exceeds the data amount that may be transmitted within the playback time. In this case, when the video data to be divided in the playback section #2 is attempted to be stored in one packet and transmitted, the relative data amount of the packet to the effective bandwidth is too large and thus the probability that the packet drops off on the transmission path increases. Moreover, when the video data of the playback section #2 is stored in one packet and transmitted, the time elapsed from the transmission start until the completion of the reception of the packet by the destination terminal apparatus becomes longer than the playback time of "one second". Therefore, the arrival of the packet at the destination terminal apparatus is delayed, and by the time when video data in the packet is to be played back, the video data might not arrive in time. These factors increase the risk that the destination terminal apparatus is not able to continue the playback operation.

Then, the distribution apparatus 100 adjusts the playback section so that the data amount of the playback section does not exceed the data amount that may be transmitted within the playback time of the playback section. Then, as illustrated in FIG. 12, the playback data amount of any of the playback sections does not exceed the data amount that may be transmitted within the playback time of the corresponding playback section. In this case, as illustrated in the lower part of FIG. 11, the minimum value of the speed when the data of each adjusted playback section is stored in an individual packet and transmitted at a prescribed speed becomes not more than the effective bandwidth. Accordingly, when each video data having been divided in the adjusted playback section is stored in a packet and transmitted, the risks of drop-off and/or delay are reduced.

Note that a playback section may be adjusted so that the data of the playback section is transmitted in a time shorter than the playback time of the data of the playback section. Specifically, the data amount of a playback section is prevented from exceeding the value of "effective bandwidth× correction coefficient×number of unit sections×unit playback time", and the correction coefficient is set to a value larger than zero and smaller than one. Here, the effective bandwidth between the distribution apparatus 100 and the destination terminal apparatus might fluctuate during distribution of a video. Therefore, when the above-described correction coefficient is set to one, if the effective bandwidth decreases during distribution of a video, a packet of the video data might drop off or be delayed. By setting the correction coefficient smaller than one as described above, the playback section is adjusted so that a margin is given to the number of unit sections that is assigned to one packet for the effective bandwidth, and the video data is divided. Thus, the risks that a packet drops off and/or is delayed are reduced even if the effective bandwidth fluctuates during distribution of a video.

Moreover, in the above-described example, three packets to be adjusted are redivided into three new packets, but the three packets may be redivided into four or more new packets depending on the data amount.

Next, a table used by the authentication server 300 is described using FIG. 13.

FIG. 13 illustrates an example of a user information table. A user information table 311 is stored in advance in the user information storage unit 310. The user information table 311 includes the items of user ID, terminal ID, address, password, and participation flag. An identifier for identifying a user of the data distribution system 1 is set to the item of user ID. An identifier for identifying an apparatus (e.g., the terminal apparatus 200a) used by a user is set to the item of terminal ID. The address of the apparatus used by a user of the data distribution system 1 is set to the item of address. The password of a user of the data distribution system 1 is set to the item of password.

Information indicating whether a user is already authenticated by the authentication server 300 (i.e., whether a user participates in e-learning) is set to the item of participation flag. For example, when a user participates in e-learning, "TRUE" is set to the item of participation flag, while when a user does not participate in e-learning, "FALSE" is set to the item of participation flag. Moreover, in the item of participation flag, "FALSE" is set as the initial value. Subsequently, the item of participation flag is updated to "TRUE" when the authentication server 300 succeeded in authenticating a user, and the item of participation flag is updated to "FALSE" when the authentication server 300 transmits an address notification.

Figure 14:
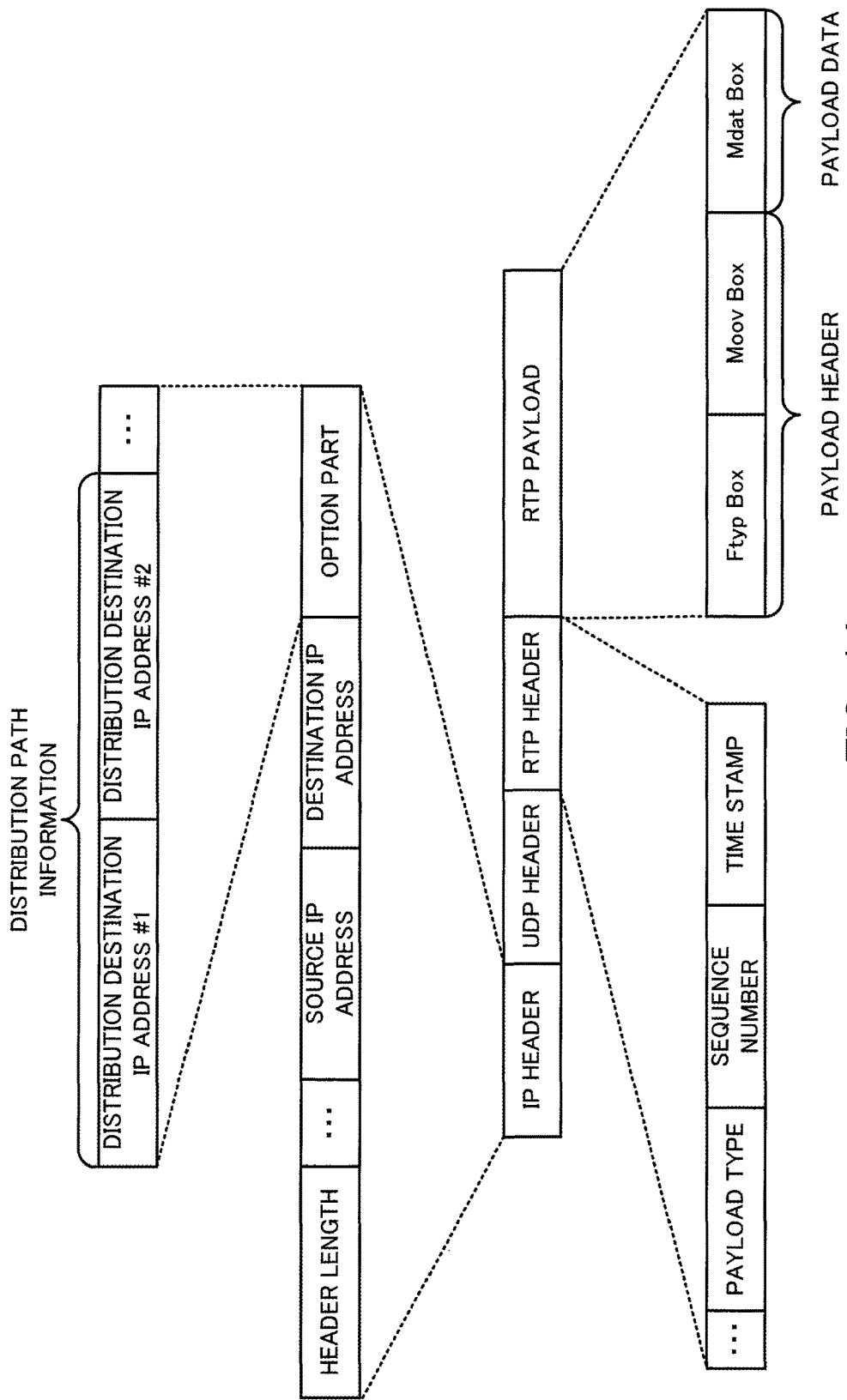
FIG. 14 illustrates an example of a packet format.
Figure 15:
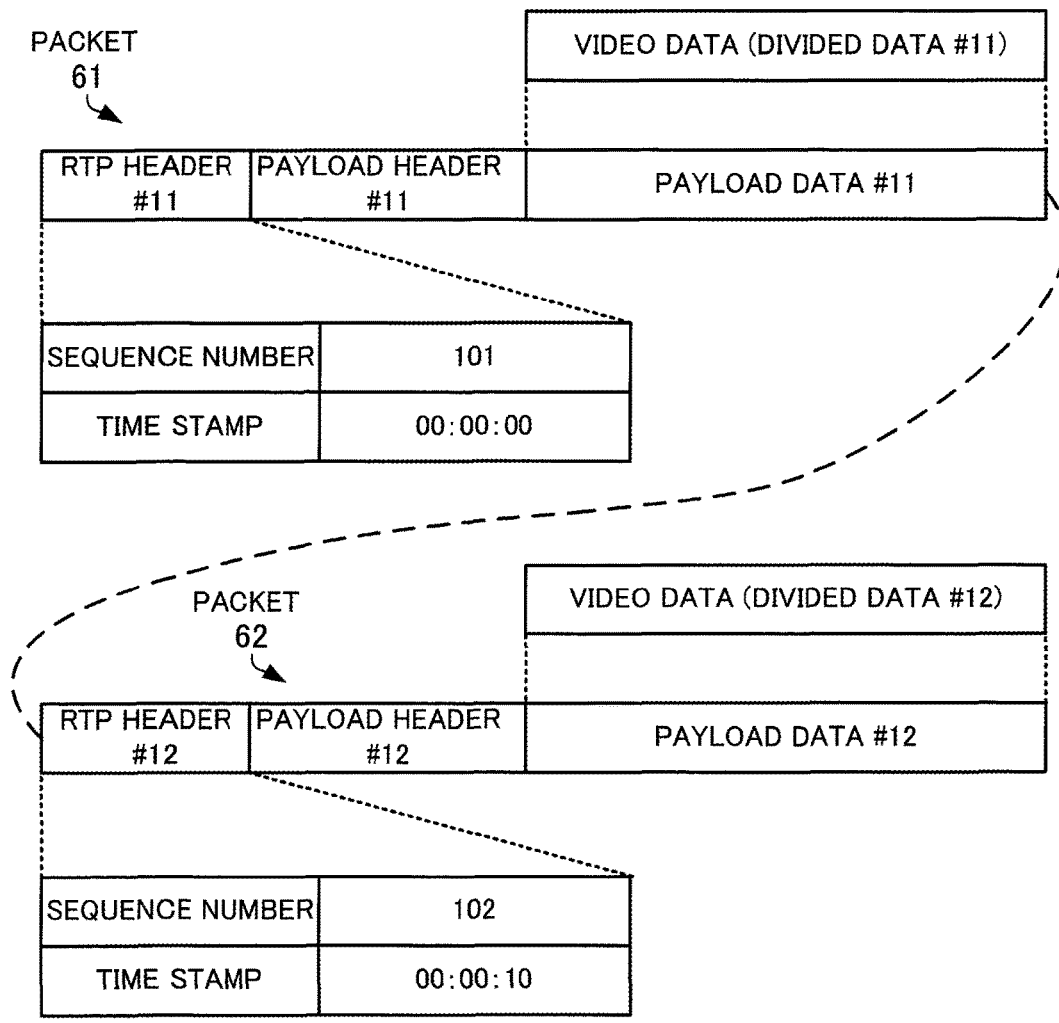
FIG. 15 illustrates an example of packetizing a video.

Next, the format of a packet used when the distribution apparatus 100 or the like distributes a video is described using FIGS. 14 to 15.

FIG. 14 illustrates an example format of a packet. In distributing a video, the distribution apparatus 100 packetizes the video using a packet as illustrated in FIG. 14. This packet includes an IP (Internet Protocol) header, a UDP (User Datagram Protocol) header, an RTP (Real-time Transport Protocol) header, and an RTP payload.

The IP header is the header part of an IP and includes a 4-bit header length, a 4-byte source IP address, and a 4-byte destination IP address. Furthermore, the IP header of a packet firstly transmitted includes a variable-length option part.

The header length indicates the data length of an IP header in the unit of 4 bytes. The data length of the IP header varies with the data length of the option part. When there is no data in the option part, the IP header is 20 bytes and 0x5 is set to the IP header. When data of 12 bytes is already set in the option part, the IP header is "20+12=32 bytes", and 0x8 is set to the header length.

The source IP address indicates the IP address of the transmission source of a packet, while the destination IP address indicates the IP address of the transmission destination of a packet.

The distribution path information indicative of the distribution path of video data is set to the option part of the first packet. In the distribution path information, the IP addresses of terminal apparatuses of the distribution destination (distribution destination IP addresses #1, #2, . . . ) are set in order that the video data goes through the terminal apparatuses on the distribution path. For example, when a video is distributed going through the terminal apparatus 200a, the terminal apparatus 200b, and the terminal apparatus 200c in this order, each distribution destination IP address is set in the distribution path information in order of the IP address of the terminal apparatus 200a, the IP address of the terminal apparatus 200b, and the IP address of the terminal apparatus 200c. The data length of the option part is "4×number of distribution destination IP addresses."

Note that, in the data distribution system 1, as the IP header, an IPv4 (Version 4) header is used, but an IPv6 (Version 6) header may be used.

The UDP header is the header part of UDP. The UDP header includes a non-illustrated 2 bytes of source port number and a non-illustrated 2 bytes of destination port number. The source port number indicates the port number used by an apparatus of the transmission source of a packet, while the destination port number indicates the port number used by the terminal apparatus of the transmission destination of the packet.

The RTP header is the header part of RTP. The RTP header includes a 7-bit payload type, a 2-byte sequence number, and a 4-byte time stamp. The payload type indicates the type of data of the RTP payload. The sequence number indicates the sequence number of a packet. A value is randomly set to the sequence number of the first packet. A value obtained by adding one to the sequence number of a previous packet is set to each of the sequence numbers of the second and subsequent packets. The time stamp indicates the playback time of the first data among the video data stored in the RTP payload.

The RTP payload is the data part of RTP and indicates a divided video. The RTP payload includes a payload header and payload data. The payload header is the header part of the divided video data, and includes "Ftyp Box" and "Moon Box". The "Ftyp Box" indicates the format type of the divided video data. The "Moon Box" indicates the information about a video, such as the data length of video data and the playback time of the video data. The divided video data is stored in the payload data, which includes "Mdat Box".

Each terminal apparatus may acquire the IP address of an apparatus serving as the request destination of a packet, with reference to the source IP address of the packet. Each terminal apparatus may acquire the IP address of a terminal apparatus of a transfer destination with reference to the distribution path information included in the first packet.

Moreover, each terminal apparatus may acquire the type of the payload data with reference to the payload type, and play back the payload data by a method corresponding to the type. Moreover, with reference to the sequence number, each terminal apparatus may detect the drop-off of a video that has been divided by the receiving side and/or may detect a change in the reception order of the packets.

Note that, the distribution path information may be set, for example, in the column of the payload data of the first packet, instead of in the IP header. In this case, for example, the divided video data may be transmitted from the second packet.

FIG. 15 illustrates an example of packetizing video data. For example, assume that the distribution apparatus 100 divided video data into divided-data #11 corresponding to the playback section from "0 to 10 seconds" and divided-data #12 corresponding to the playback section from "10 to 20 seconds" to generate a packet 61 including the divided-data #11 and a packet 62 including the divided-data #12. The packet 61 includes an RTP header #11, a payload header #11, and payload data #11, and the packet 62 includes an RTP header #12, a payload header #12, and payload data #12.

In this case, for example, as illustrated in the upper part of FIG. 15, "101" is set to the sequence number of the RTP header #11, and as illustrated in the lower part of FIG. 15, "102" is set to the sequence number of the RTP header #12. Moreover, as illustrated in the upper part of FIG. 15, "00:00:00" serving as the starting point of a playback section corresponding to the divided-data #11 is set to the time stamp of the RTP header #11, and as illustrated in the lower part of FIG. 15, "00:00:10" serving as the starting point of a playback section corresponding to the divided-data #12 is set to the sequence number of the RTP header #12.

Moreover, the header part of the divided-data #11 is set to the payload header #11 and the divided-data #11 is set to the payload data #11. Similarly, the header part of the divided-data #12 is set to the payload header #12 and the divided-data #12 is set to the payload data #12.

Figure 16:
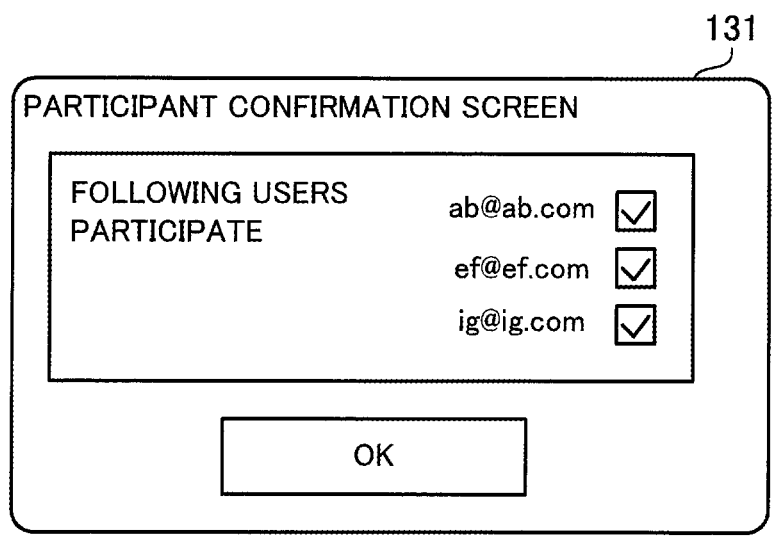
FIG. 16 illustrates a participant confirmation screen.
Figure 17:
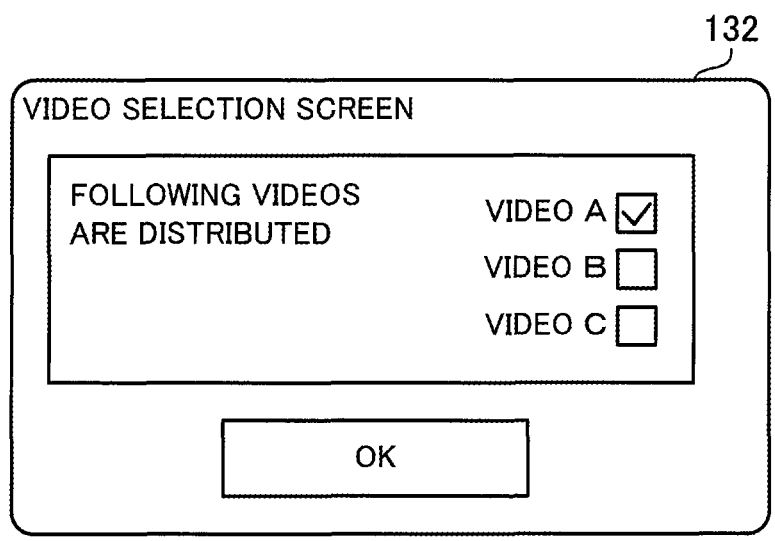
FIG. 17 illustrates a video selection screen.

Next, a screen displayed by the distribution apparatus 100 is described using FIGS. 16 to 17.

FIG. 16 illustrates a participant confirmation screen. A participant confirmation screen 131 is the screen for an administrator of the distribution apparatus 100 to confirm a participant in e-learning. The participant confirmation screen 131 is displayed on the display 51 when the distribution apparatus 100 receives an address request. On the right of the participant confirmation screen 131, the ID of a user belonging to a group allowed to participate in e-learning is displayed, and a check box is displayed on the right of each user ID. In this case, a check mark is displayed on the check box on the right of the ID of a user participating in e-learning. For example, in the participant confirmation screen 131 of FIG. 16, the check mark is displayed on every check box corresponding to the ID of a plurality of displayed users, which therefore indicates that any one of the users specified by the distribution apparatus 100 will participate in e-learning.

An administrator, for example, confirms the participants in e-learning and depresses an OK button. Upon detecting that the OK button on the participant confirmation screen 131 is depressed, the distribution apparatus 100 continues the process of distributing the video.

Note that, when an administrator of the distribution apparatus 100 does not need to confirm the participants in e-learning, the distribution apparatus 100 may continue the process of distributing the video, without waiting for the detection of depression of the OK button. Moreover, in a similar case, the distribution apparatus 100 may continue the process of distributing the video, without displaying the participant confirmation screen 131.

FIG. 17 illustrates a video selection screen. A video selection screen 132 is the screen for causing the administrator of the distribution apparatus 100 to select a video used in e-learning. The administrator selects a video to be distributed, for example in consideration of the understanding level, learning level, and/or the like of a participant in e-learning. The video selection screen 132 is displayed on the display 51 after the distribution apparatus 100 receives an address notification.

On the right of the video selection screen 132, information (e.g., the name of a video) indicative of a video that may be distributed by the distribution apparatus 100 is displayed, and the check box is displayed on the right of each piece of information. In this case, the administrator inputs the check mark into the check box on the right of a video to be distributed, and depresses the OK button. Upon detecting that the OK button on the video selection screen 132 is depressed, the distribution apparatus 100 will distribute the video corresponding to the check box into which the check mark has been input. For example, in the video selection screen 132 of FIG. 17, the check mark is input into the check box on the right of the "video A", while in the check box on the right of each of the "video B" and "video C", the check mark has not been input. When the OK button on the video selection screen 132 is depressed in this state, the "video A" will be distributed but the "video B" and "video C" will not be distributed.

Note that, when a video to be distributed is determined in advance, the distribution apparatus 100 may distribute the predetermined video without displaying the video selection screen 132. In this case, the information indicative of the predetermined video is stored in the video information storage unit 120 in advance, for example.

Figure 18:
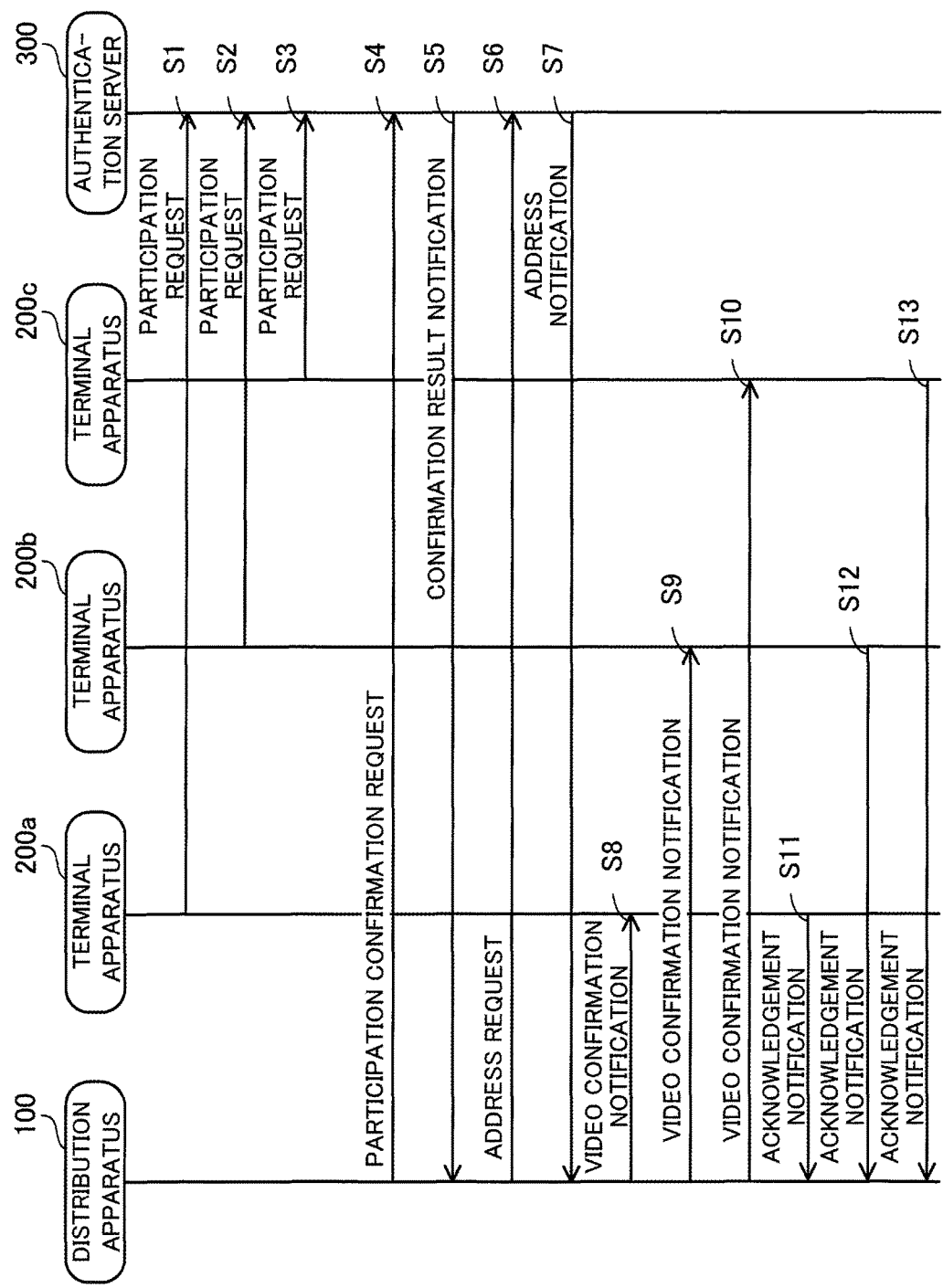
FIG. 18 illustrates an example sequence for acquiring the address of a distribution destination.
Figure 19:
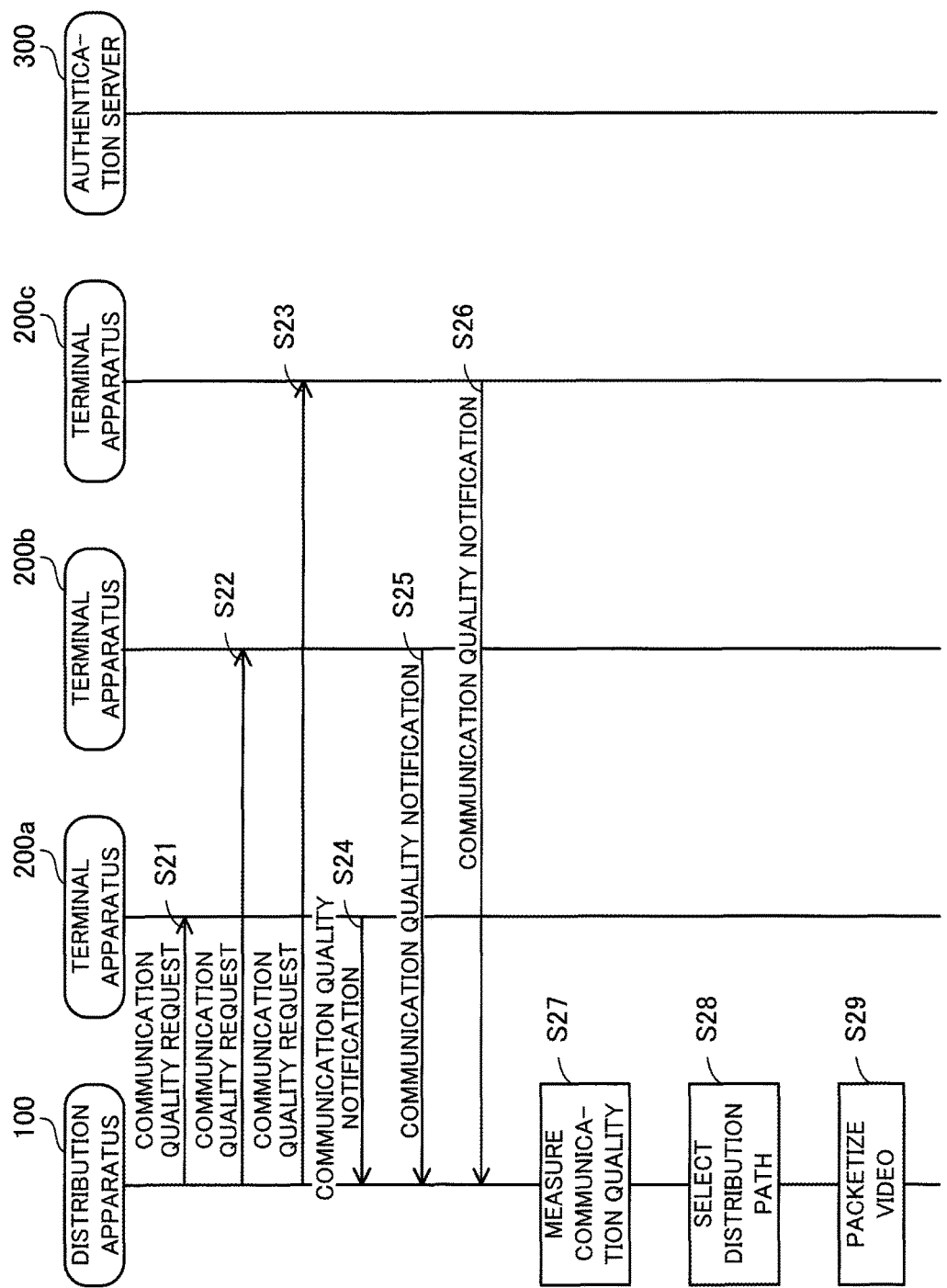
FIG. 19 illustrates an example sequence for selecting a distribution path and generating a packet.
Figure 20:
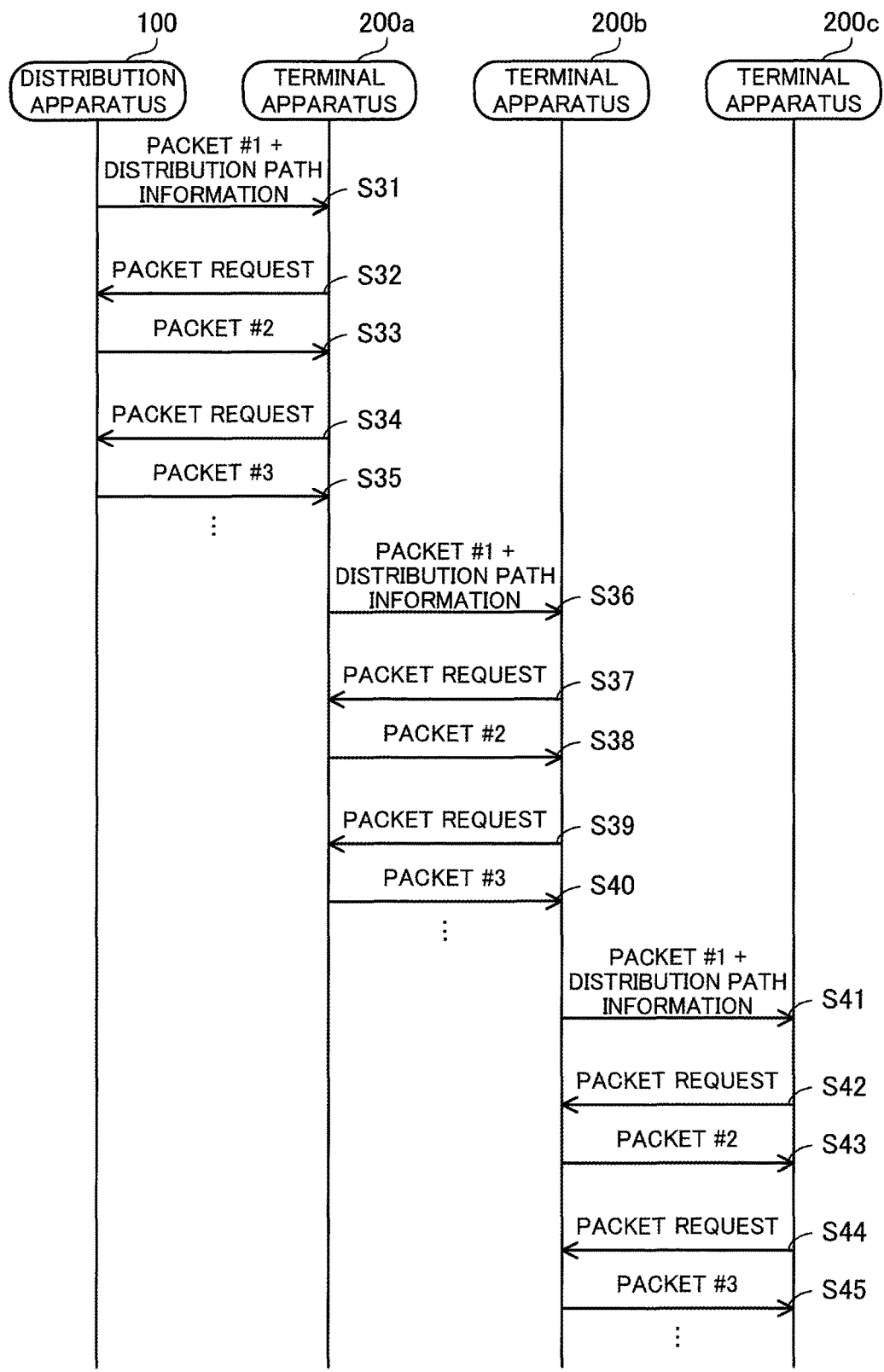
FIG. 20 illustrates an example sequence in distributing video data.

Next, an example sequence in distributing a video in the data distribution system 1 is described using FIGS. 18 to 20. In FIGS. 18 to 20, an example sequence is described in which the distribution apparatus 100 distributes a video to the terminal apparatuses 200a, 200b, and 200c.

FIG. 18 illustrates an example sequence for acquiring the address of a distribution destination. The distribution apparatus 100 and the terminal apparatuses 200a, 200b, and 200c do not recognize each other's address, but recognize only the address of the authentication server 300. Then, in the data distribution system 1, by executing the following sequence, the addresses of terminal apparatuses used by participants in e-learning are provided to the distribution apparatus 100. Hereinafter, the process illustrated in FIG. 18 is described following the step number.

(S1) The terminal apparatus 200a transmits a participation request to the authentication server 300. The participation request includes the ID and password of a user. The authentication server 300 receives the participation request from the terminal apparatus 200a, and authenticates the user using the received user ID and password. Specifically, the authentication server 300 determines whether a record including the received user ID and password is searched from the user information table 311. When the record has been searched, it is determined that the authentication has been successful, while when the record has not been searched, it is determined that the authentication has been unsuccessful. When it is determined that the authentication has been successful, the authentication server 300 updates the participation flag of the searched record to "TRUE". In FIG. 18, assume that the authentication has been successful, and hereinafter it is the same also in steps S2 to S3.

Subsequently, although not illustrated, the authentication server 300 transmits the authentication result to the terminal apparatus 200a, and the terminal apparatus 200a receives the authentication result from the authentication server 300.

(S2) The terminal apparatus 200b transmits a participation request to the authentication server 300. The authentication server 300 receives the participation request from the terminal apparatus 200b, authenticates a user by a method similar to step S1 using the received user ID and password, and when the authentication has been successful, the authentication server 300 updates the user information table 311.

Subsequently, although not illustrated, the authentication server 300 transmits the authentication result to the terminal apparatus 200b, and the terminal apparatus 200b receives the authentication result from the authentication server 300.

(S3) The terminal apparatus 200c transmits a participation request to the authentication server 300. The authentication server 300 receives the participation request from the terminal apparatus 200c, authenticates a user by a method similar to step S1 using the received user ID and password, and when the authentication has been successful, the authentication server 300 updates the user information table 311.

Subsequently, although not illustrated, the authentication server 300 transmits the authentication result to the terminal apparatus 200c, and the terminal apparatus 200c receives the authentication result from the authentication server 300.

(S4) At a time a predetermined time (e.g., 15 minutes) earlier than a time to start e-learning, the distribution apparatus 100 transmits a participation confirmation request to the authentication server 300. The participation confirmation request includes the ID of each user who may participate in e-learning. The authentication server 300 receives the participation confirmation request from the distribution apparatus 100.

(S5) The authentication server 300 transmits a confirmation result notification to the distribution apparatus 100. The confirmation result notification includes the ID of each user authenticated in Steps S1 to S3 among the IDs of the users included in the participation confirmation request.

The ID of each authenticated user is acquired by searching a record whose participation flag is "TRUE" from the user information table 311 and reading the user ID of the searched record.

The distribution apparatus 100 receives the confirmation result notification from the authentication server 300.

(S6) The distribution apparatus 100 transmits an address request to the authentication server 300. The address request includes the ID of each user included in the confirmation result notification, i.e., the ID of each participant in e-learning. The authentication server 300 receives the address request from the distribution apparatus 100.

(S7) The authentication server 300 transmits an address notification to the distribution apparatus 100. The address notification includes the address of a terminal apparatus used by each user (i.e., participant in e-learning) included in the address request.

The address of each participant in e-learning may be acquired by searching a record that matches either one of the users included in the address request from the records searched from the user information table 311 in step S5, and reading the address of the searched record. Subsequently, the authentication server 300 updates the participation flag of the searched record to "FALSE".

The distribution apparatus 100 receives the address notification from the authentication server 300. This allows the distribution apparatus 100 to directly communicate with each of the terminal apparatuses 200a, 200b, and 200c of distribution destinations.

(S8) The distribution apparatus 100 transmits a video confirmation notification to the terminal apparatus 200a. The video confirmation notification includes the information indicative of a video to be distributed. The distribution apparatus 100 uses the information indicative of a video to be distributed that is selected by the administrator from the video selection screen 132 after the sequence of step S7. It is the same also in steps S9 and S10. The terminal apparatus 200a receives the video confirmation notification from the distribution apparatus 100.

(S9) The distribution apparatus 100 transmits a video confirmation notification to the terminal apparatus 200b. The terminal apparatus 200b receives the video confirmation notification from the distribution apparatus 100.

(S10) The distribution apparatus 100 transmits a video confirmation notification to the terminal apparatus 200c. The terminal apparatus 200c receives the video confirmation notification from the distribution apparatus 100.

(S11) The terminal apparatus 200a transmits an acknowledgement notification to the distribution apparatus 100.

(S12) The terminal apparatus 200b transmits an acknowledgement notification to the distribution apparatus 100.

(S13) The terminal apparatus 200c transmits an acknowledgement notification to the distribution apparatus 100.

FIG. 19 illustrates an example sequence for selecting a distribution path and generating a packet. As previously described, in distributing video data to each terminal apparatus in a daisy chain fashion from the distribution apparatus 100, there is a plurality of distribution path candidates. Then, in the data distribution system 1, a distribution path for distributing video data is selected by executing the following sequence. In FIG. 19, assume that the distribution apparatus 100 has already acquired the addresses of the terminal apparatuses 200a, 200b, and 200c from the address notification received from the authentication server 300. Hereinafter, the process illustrated in FIG. 19 is described following the step number.

(S21) The distribution apparatus 100 transmits a communication quality request to the terminal apparatus 200a. The communication quality request includes the addresses of the terminal apparatuses 200a, 200b, and 200c (the same is true of steps S22 and S23). The terminal apparatus 200a receives the communication quality request from the distribution apparatus 100. The terminal apparatus 200a acquires the address of each terminal apparatus of the measurement destination with reference to the communication quality request.

(S22) The distribution apparatus 100 transmits a communication quality request to the terminal apparatus 200b. The terminal apparatus 200b receives the communication quality request from the distribution apparatus 100. The terminal apparatus 200b acquires the address of each terminal apparatus of the measurement destination with reference to the communication quality request.

(S23) The distribution apparatus 100 transmits a communication quality request to the terminal apparatus 200c. The terminal apparatus 200c receives the communication quality request from the distribution apparatus 100. The terminal apparatus 200c acquires the address of each terminal apparatus of the measurement destination with reference to the communication quality request.

(S24) The terminal apparatus 200a measures an effective bandwidth between the terminal apparatus 200a and the terminal apparatus 200b and an effective bandwidth between the terminal apparatus 200a and the terminal apparatus 200c, and transmits a communication quality notification including each measured effective bandwidth to the distribution apparatus 100. The distribution apparatus 100 receives the communication quality notification from the terminal apparatus 200a. Thus, the distribution apparatus 100 may acquire the effective bandwidth between the terminal apparatus 200a and the terminal apparatus 200b and the effective bandwidth between the terminal apparatus 200a and the terminal apparatus 200c.

(S25) The terminal apparatus 200b measures an effective bandwidth between the terminal apparatus 200b and the terminal apparatus 200a and an effective bandwidth between the terminal apparatus 200b and the terminal apparatus 200c, and transmits a communication quality notification including each measured effective bandwidth to the distribution apparatus 100. The distribution apparatus 100 receives the communication quality notification from the terminal apparatus 200b. Thus, the distribution apparatus 100 may acquire the effective bandwidth between the terminal apparatus 200b and the terminal apparatus 200a and the effective bandwidth between the terminal apparatus 200b and the terminal apparatus 200c.

(S26) The terminal apparatus 200c measures an effective bandwidth between the terminal apparatus 200c and the terminal apparatus 200a and an effective bandwidth between the terminal apparatus 200c and the terminal apparatus 200b, and transmits a communication quality notification including each measured effective bandwidth to the distribution apparatus 100. The distribution apparatus 100 receives the communication quality notification from the terminal apparatus 200c. Thus, the distribution apparatus 100 may acquire the effective bandwidth between the terminal apparatus 200c and the terminal apparatus 200a and the effective bandwidth between the terminal apparatus 200c and the terminal apparatus 200b.

(S27) The distribution apparatus 100 measures an effective bandwidth between the distribution apparatus 100 and the terminal apparatus 200a, an effective bandwidth between the distribution apparatus 100 and the terminal apparatus 200b, and an effective bandwidth between the distribution apparatus 100 and the terminal apparatus 200c.

(S28) The distribution apparatus 100 selects one distribution path from among a plurality of distribution path candidates by the method described in FIG. 8, based on the effective bandwidths acquired in steps S24 to S27.

(S29) The distribution apparatus 100 packetizes a video to be distributed.

FIG. 20 illustrates an example sequence in distributing video data. At the time when the distribution apparatus 100 generates a packet, the terminal apparatuses 200a, 200b, and 200c have not yet recognized the distribution path of the video data. Then, in the data distribution system 1, by executing the following sequence, the video data is distributed via a distribution path selected by the distribution apparatus 100. In FIG. 20, assume that a distribution path going through from the distribution apparatus 100 to the terminal apparatus 200a, the terminal apparatus 200b, and the terminal apparatus 200c in this order has been selected by the distribution apparatus 100. Moreover, packets #1 to #3 are a part of the packet when the video data to be distributed has been packetized. The "packet #1" indicates a packet where the sequence number of the RTP header is "1". That is, the packet #1 serves as a packet that is firstly transmitted to the terminal apparatus. Similarly, the "packet #2" indicates a packet where the sequence number of the RTP header is "2". The "packet #3" indicates a packet where the sequence number of the RTP header is "3".

(S31) The distribution apparatus 100 transmits the first packet #1 including distribution path information to the terminal apparatus 200a. The terminal apparatus 200a receives the packet #1 from the distribution apparatus 100.

(S32) The terminal apparatus 200a transmits a packet request to the distribution apparatus 100. The destination address of the packet request may be acquired from the source address of the received packet #1. The distribution apparatus 100 receives the packet request from the terminal apparatus 200a.

(S33) The distribution apparatus 100 transmits the packet #2 to the terminal apparatus 200a in accordance with the packet request. The terminal apparatus 200a receives the packet #2 from the distribution apparatus 100.

(S34) The terminal apparatus 200a transmits a packet request to the distribution apparatus 100. The distribution apparatus 100 receives the packet request from the terminal apparatus 200a.

(S35) The distribution apparatus 100 transmits the packet #3 to the terminal apparatus 200a in accordance with the packet request. The terminal apparatus 200a receives the packet #3 from the distribution apparatus 100.

Note that, after receiving the packet #1 in step S31, the terminal apparatus 200a confirms the data accumulation amount of the decoder buffer, and transmits the packet request to the distribution apparatus 100 when the data accumulation amount is less than a predetermined threshold.

(S36) The terminal apparatus 200a transmits the first packet #1 including distribution path information to the terminal apparatus 200b. The address of the terminal apparatus 200b, i.e., the transfer destination address of the video data, is acquired by searching the distribution destination address of the terminal apparatus 200a from the distribution path information received in step S31 and referring to the distribution destination address next to the searched distribution destination address. The terminal apparatus 200*b* receives the packet #1 from the terminal apparatus 200*a*.

(S37) The terminal apparatus 200*b* transmits a packet request to the terminal apparatus 200*a*. The destination address of the packet request may be acquired by referring to the source address of the received packet #1. The terminal apparatus 200*a* receives the packet request from the terminal apparatus 200*b*.

(S38) The terminal apparatus 200*a* transmits the packet #2 to the terminal apparatus 200*b* in accordance with the packet request. The terminal apparatus 200*b* receives the packet #2 from the terminal apparatus 200*a*.

(S39) The terminal apparatus 200*b* transmits a packet request to the terminal apparatus 200*a*. The terminal apparatus 200*a* receives the packet request from the terminal apparatus 200*b*.

(S40) The terminal apparatus 200*a* transmits the packet #3 to the terminal apparatus 200*b* in accordance with the packet request. The terminal apparatus 200*b* receives the packet #3 from the terminal apparatus 200*a*.

Note that, after receiving the packet #1 in step S36, the terminal apparatus 200*b* confirms the data accumulation amount of the decoder buffer, and transmits the packet request to the terminal apparatus 200*a* when the data accumulation amount is less than a predetermined threshold.

(S41) The terminal apparatus 200*b* transmits the first packet #1 including distribution path information to the terminal apparatus 200*c*. The address of the terminal apparatus 200*c*, i.e., the transfer destination address of the video data, is acquired by searching the distribution destination address of the terminal apparatus 200*b* from the distribution path information received in step S36 and referring to the distribution destination address next to the searched distribution destination address. The terminal apparatus 200*c* receives the packet #1 from the terminal apparatus 200*b*.

(S42) The terminal apparatus 200*c* transmits a packet request to the terminal apparatus 200*b*. The destination address of the packet request may be acquired from the source address of the first packet #1. The terminal apparatus 200*b* receives the packet request from the terminal apparatus 200*c*.

(S43) The terminal apparatus 200*b* transmits the packet #2 to the terminal apparatus 200*c* in accordance with the packet request. The terminal apparatus 200*c* receives the packet #2 from the terminal apparatus 200*b*.

(S44) The terminal apparatus 200*c* transmits a packet request to the terminal apparatus 200*b*. The terminal apparatus 200*b* receives the packet request from the terminal apparatus 200*c*.

(S45) The terminal apparatus 200*b* transmits the packet #3 to the terminal apparatus 200*c* in accordance with the packet request. The terminal apparatus 200*c* receives the packet #3 from the terminal apparatus 200*b*.

Note that, after receiving the packet #1 in step S41, the terminal apparatus 200*c* confirms the data accumulation amount of the decoder buffer, and transmits the packet request to the terminal apparatus 200*b* when the data accumulation amount is less than a predetermined threshold.

Here, the terminal apparatus 200*c* may recognize that there is no transfer destination terminal apparatus by confirming that the distribution destination address of the terminal apparatus 200*c* is the last distribution destination address of the distribution path information received in step S41.

Moreover, the terminal apparatuses 200*a* and 200*b* that transfer the video data adjust the playback section as needed, based on the analysis result of the received packet stored in the transmission buffer of each of the terminal apparatuses 200*a* and 200*b*, and regenerate a transmission packet for each adjusted playback section. The packet to be transferred is preferably a packet whose playback section is already defined. Therefore, the terminal apparatuses 200*a* and 200*b* are adapted to transfer a packet after receiving a plurality of packets, as illustrated in FIG. 20.

Note that, in the data distribution system 1, the distribution path information is included in the first packet and distributed via a distribution path connected in a daisy chain fashion from the distribution apparatus 100, but may be simultaneously transmitted from the distribution apparatus 100 to each terminal apparatus. Moreover, before the first packet is transmitted, a packet including only the distribution path information may be distributed via a distribution path connected in a daisy chain fashion from the distribution apparatus 100.

Next, using FIGS. 21 to 26, the process of distributing video data using the data distribution system is described using a flowchart.

Figure 21:
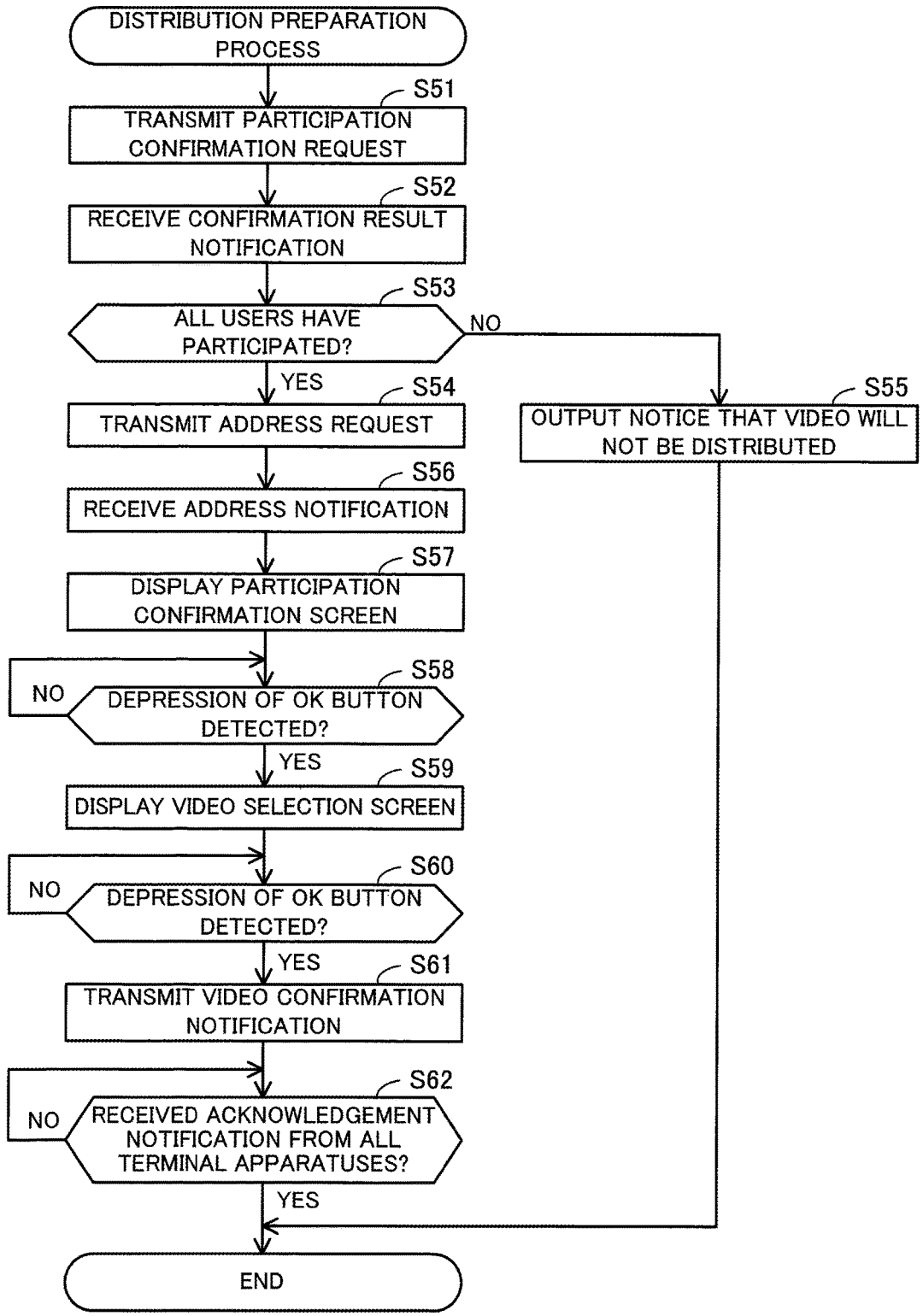
FIG. 21 is a flowchart illustrating an example of a distribution preparation process.

FIG. 21 is a flowchart illustrating an example of a distribution preparation process. The process described using FIG. 21 is executed by the distribution apparatus 100. In FIG. 21, assume that the authentication server 300 has already authenticated participants in e-learning. Hereinafter, the process illustrated in FIG. 21 is described following the step number.

(S51) The distribution preparation unit 130 transmits a participation confirmation request to the authentication server 300 in order to confirm that all the users belonging to a group that may participate in e-learning have already participated in e-learning. The participation confirmation request includes the ID of each user belonging to the group that may participate in e-learning.

The group that may participate in e-learning may be acquired by detecting an input operation of an administrator of the distribution apparatus 100. Alternatively, the information indicative of the group that may participate in e-learning may be stored in advance in a storage area of the management information storage unit 110 and acquired from this storage destination. Each user belonging to this group may be acquired by searching a record including this group, which is acquired by the above-described method, from the group information table 111 and reading the user of each searched record.

(S52) The distribution preparation unit 130 receives a confirmation result notification from the authentication server 300. The confirmation result notification includes the ID of a user participating in e-learning (i.e., the ID of a participant in e-learning) among the IDs of the users included in the participation confirmation request transmitted in step S51.

(S53) The distribution preparation unit 130 determines whether all the users belonging to the group that may participate in e-learning have already participated in e-learning. Specifically, the distribution preparation unit 130 determines whether all the users included in the participation confirmation request transmitted in step S51 are included in the confirmation result notification transmitted in step S52. When all the users have already participated in e-learning, the process is advanced to step S54. When a user who has not yet participated is included, the process is advanced to step S55.

(S54) The distribution preparation unit 130 transmits an address request to the authentication server 300. The address request includes the ID of a participant in e-learning. The ID of a participant in e-learning may be acquired from the confirmation result notification received in step S52.

(S55) The distribution preparation unit 130 outputs a notice that a video will not be distributed. The examples of the method for outputting the notice include a method for displaying this notice on the display 51, but not limited thereto.

(S56) The distribution preparation unit 130 receives an address notification from the authentication server 300. The address notification includes the address of a terminal apparatus serving as the distribution destination of a video. The terminal apparatus serving as the distribution destination of a video is the terminal apparatus used by a participant in e-learning. The participant in e-learning may be identified by the ID of the participant included in the address request transmitted in step S54.

(S57) The distribution preparation unit 130 displays the participant confirmation screen 131 as described in FIG. 16, on the display 51.

(S58) The distribution preparation unit 130 determines whether the depression of the OK button on the participant confirmation screen 131 has been detected. The OK button is depressed by the administrator of the distribution apparatus 100, for example. The same is true of the video selection screen 132 described later. When the depression of the OK button has been detected, the process is advanced to step S59. When the depression of the OK button has not yet been detected, the process is advanced to step S58.

That is, the distribution preparation unit 130 waits until the depression of the OK button on the participant confirmation screen 131 is detected.

(S59) The distribution preparation unit 130 displays the video selection screen 132 as described in FIG. 17, on the display 51.

(S60) The distribution preparation unit 130 determines whether the depression of the OK button on the video selection screen 132 has been detected. When the depression of the OK button has been detected, the process is advanced to step S61. When the depression of the OK button has not yet been detected, the process is advanced to step S60.

That is, the distribution preparation unit 130 waits until the depression of the OK button on the video selection screen 132 is detected.

(S61) The distribution preparation unit 130 transmits a video confirmation notification to each terminal apparatus of the distribution destination. The video confirmation notification includes the information indicative of a video to be distributed. The information indicative of the video is the information that is selected from the information on the video selection screen 132 by the administrator of the distribution apparatus 100. The address of each terminal apparatus of the distribution destination may be acquired from the address notification received in step S56.

(S62) The distribution preparation unit 130 determines whether an acknowledgement notification has been received from all the terminal apparatuses. When the acknowledgement notification is already received from all the terminal apparatuses, the process is terminated. When there is a terminal apparatus from which the acknowledgement notification has not yet been received, the process is advanced to step S62. That is, the distribution preparation unit 130 waits until it receives the acknowledgement notification from all the terminal apparatuses.

Note that, in the data distribution system 1, a video will not be distributed when all the users belonging to a group that may participate in e-learning will not participate in e-learning, but a video may be distributed even when only some users of the group participate. In this case, steps S53 and S55 are not needed.

Moreover, as described in FIG. 16, the distribution preparation unit 130 may continue the distribution preparation process without waiting for the detection of the depression of the OK button. In this case, step S58 is not needed. Moreover, in a similar case, the distribution preparation unit 130 may continue the distribution preparation process without displaying the video selection screen 132. In this case, steps S59 and S60 are not needed.

Furthermore, by omitting steps S61 and S62, the distribution preparation unit 130 may prevent a participant in e-learning form confirming a video to be distributed.

Figure 22:
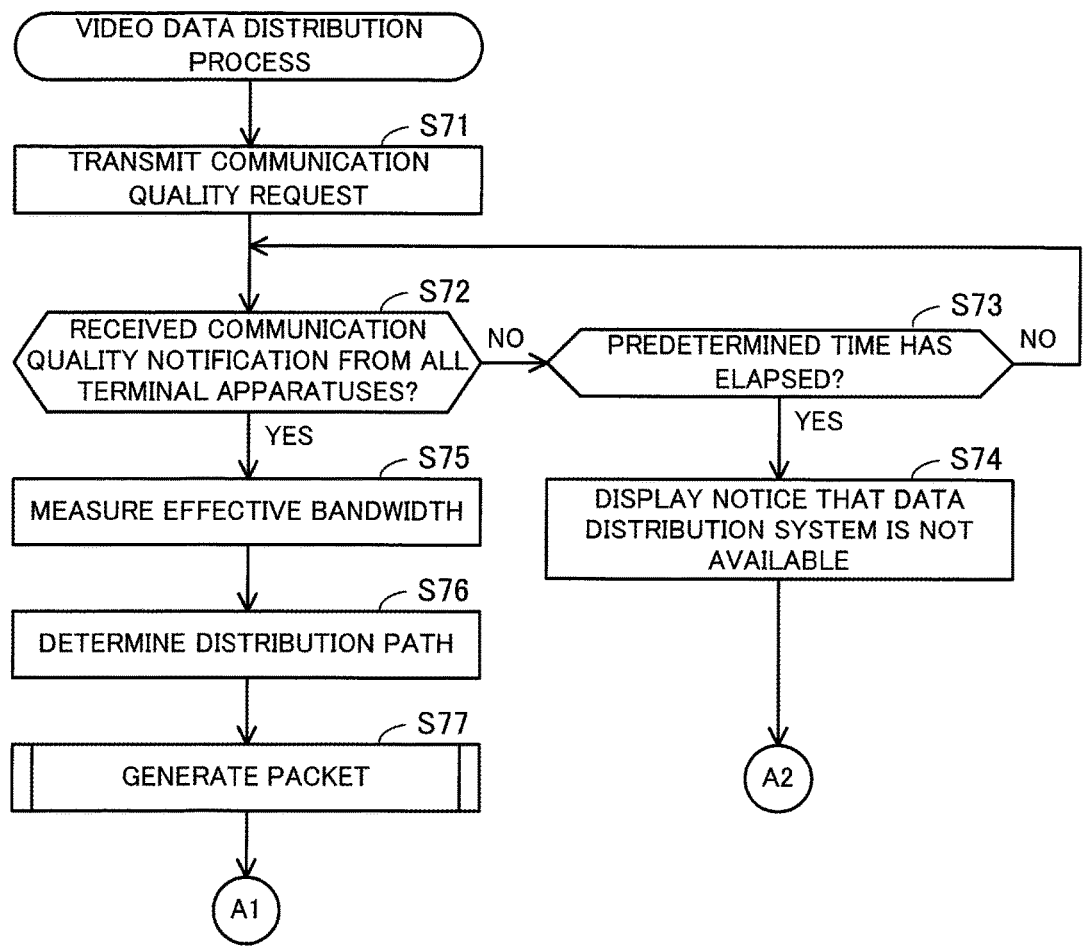
FIG. 22 is a flowchart illustrating an example of the distribution process of video data.
Figure 23:
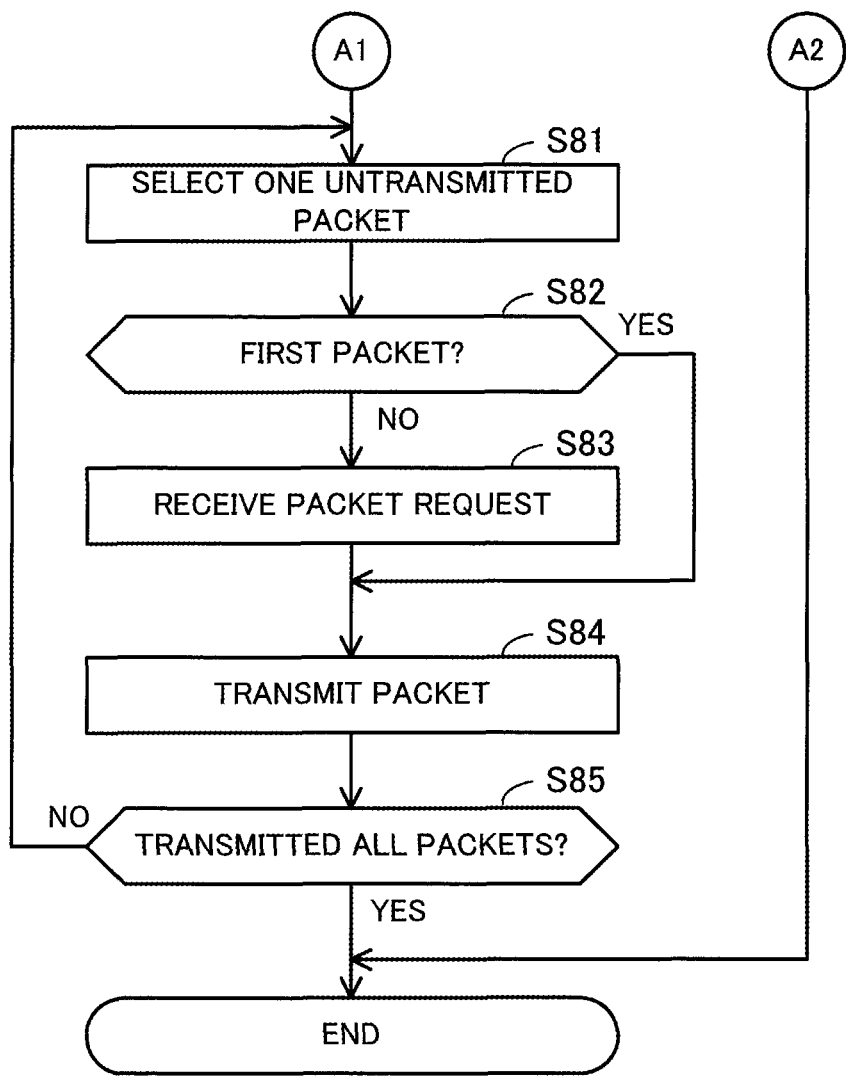
FIG. 23 is the flowchart (continued) illustrating the example of the distribution process of the video data.

FIG. 22 is a flowchart illustrating an example of the distribution process of video data. The process described using FIGS. 22 to 23 is executed by the distribution apparatus 100 after execution of the distribution preparation process described in FIG. 21. Hereinafter, the process illustrated in FIGS. 22 to 23 is described following the step number.

(S71) The communication quality acquisition unit 140 transmits a communication quality request to each terminal apparatus of the distribution destination of a video. The communication quality request includes the address of each terminal apparatus serving as the distribution destination of the video. The address of each terminal apparatus is already acquired by the distribution preparation unit 130 in step S56 of FIG. 21.

(S72) The communication quality acquisition unit 140 determines whether a communication quality notification is already received from all the terminal apparatuses of the distribution destination of the video. The communication quality notification includes the information indicative of the effective bandwidth between a terminal apparatus of the transmission source of the communication quality notification and each of the other terminal apparatuses.

When the communication quality notification is already received from all the terminal apparatuses, the communication quality acquisition unit 140 registers the received effective bandwidth into the distribution path information table 112, and advances the process to step S75.

When there is a terminal apparatus from which the communication quality notification has not yet been received, the process is advanced to step S73.

(S73) The communication quality acquisition unit 140 determines whether a predetermined time has elapsed from the first execution of step S72. When a predetermined time has elapsed, the process is advanced to step S74. When a predetermined time has not yet elapsed, the process is advanced to step S72.

That is, until a predetermined time elapses from the first execution of step S72, the communication quality acquisition unit 140 waits until the communication quality notification is received from all the terminal apparatuses of the distribution destination of the video.

(S74) The communication quality acquisition unit 140 outputs a notice that the data distribution system 1 is not available, in a manner similar to step S55 in FIG. 21. Then, the process is terminated.

(S75) The communication quality acquisition unit 140 measures the effective bandwidth between the distribution apparatus 100 and each terminal apparatus of the distribution destination of the video. The effective bandwidth may be measured, for example, by transmitting ping to the terminal apparatus of the measurement destination, receiving a response result of the transmitted ping, and being based on the received response result. Moreover, for example, an SR (Sender Report) packet specified in RTPC (Real-time Transport Protocol Control protocol) is transmitted to a terminal apparatus of a measurement destination, and an RR (Receiver Report) packet (specified in RTPC) corresponding to the transmitted SR packet is received. Then, the effective bandwidth may be measured based on the received RR packet and the time elapsed from the transmission of the SR packet to the reception of the RR packet. The communication quality acquisition unit 140 registers each measured effective bandwidth into the distribution path information table 112.

(S76) The distribution path selection unit 150 selects one distribution path from the distribution path candidates registered in the distribution path information table 112, with the method described in FIG. 8.

(S77) The packet generation unit 160 packetizes the video data to be distributed. The detail of the process of packetizing video data is described later using FIG. 24.

FIG. 23 is the flowchart (continued) illustrating the example of the distribution process of the video data.

(S81) The video distribution unit 170 selects one untransmitted packet from a plurality of packets packetized in step S77 of FIG. 22. In this case, the video distribution unit 170 selects a packet having the smallest sequence number included in the RTP header, among the plurality of packets.

(S82) The video distribution unit 170 determines whether the first packet is already transmitted. Whether a packet is the first packet may be determined based on whether the packet includes the distribution path information, for example. When the packet is the first packet, the process is advanced to step S84. When the packet is the second or subsequent packet, the process is advanced to step S83.

(S83) The video distribution unit 170 receives a packet request from the destination terminal apparatus.

(S84) The video distribution unit 170 transmits a packet to the destination terminal apparatus. The destination terminal apparatus may be acquired from the distribution path determined in step S76 of FIG. 22.

(S85) The video distribution unit 170 determines whether all the packets packetized in step S77 of FIG. 22 are already transmitted to the destination terminal apparatus. When all the packets are already transmitted, the process is terminated. When there is an untransmitted packet, the process is advanced to step S81.

Figure 24:
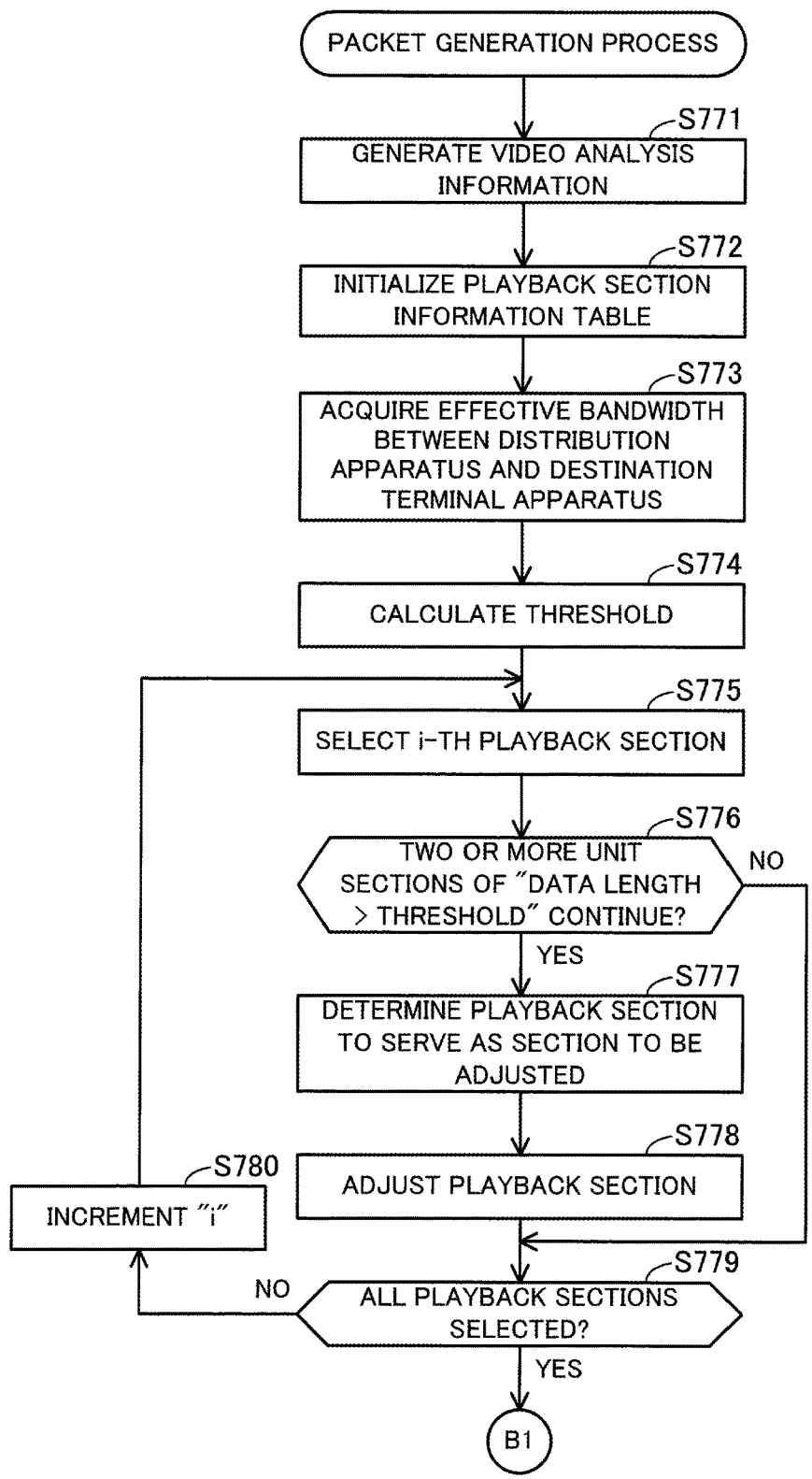
FIG. 24 is a flowchart illustrating an example of a packet generation process.
Figure 25:
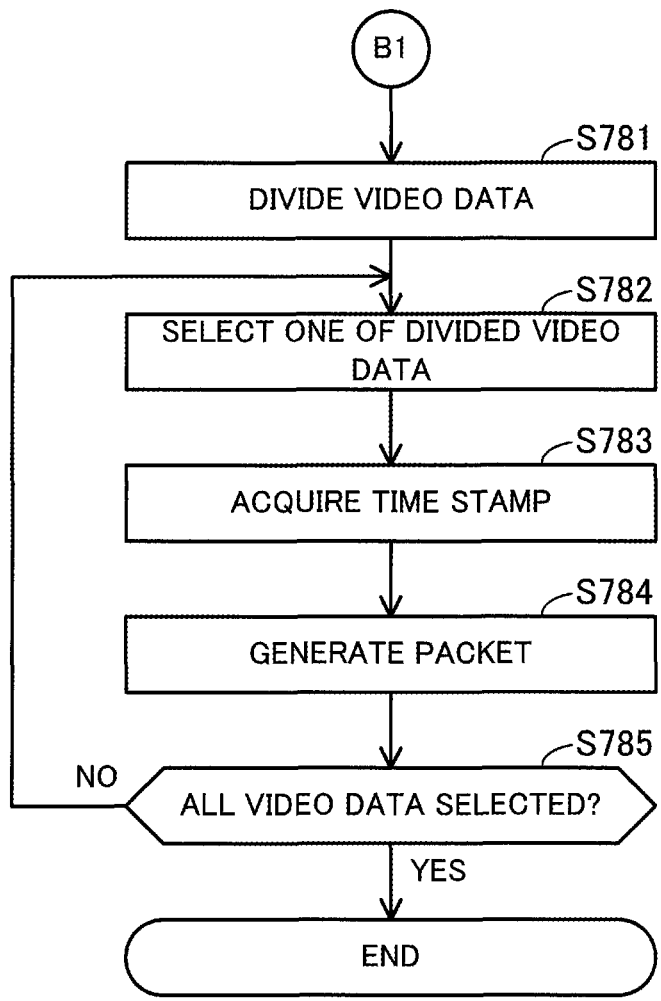
FIG. 25 is the flowchart (continued) illustrating the example of the packet generation process.

FIG. 24 is a flowchart illustrating an example of a packet generation process. The process described using FIGS. 24 to 25 is executed in step S77 of FIG. 22. Hereinafter, the process illustrated in FIGS. 24 to 25 is described following the step number.

(S771) The packet generation unit 160 analyzes video data to be distributed, and generates the video analysis information 121. Specifically, the packet generation unit 160 registers the playback data amount for each unit section in the video data into the video analysis information 121.

(S772) The packet generation unit 160 initializes the playback section information table 122. Specifically, the packet generation unit 160 divides the video data to be distributed into playback sections for each prescribed playback time (here, one second), using the method described in FIGS. 9 to 10. Hereinafter, the playback time of this divided playback section may be referred to as an "initial playback time." The packet generation unit 160 registers, based on the video analysis information 121, the number of unit sections and playback data amount for each divided playback section into the playback section information table 122.

(S773) The packet generation unit 160 acquires the effective bandwidth between the distribution apparatus 100 and the destination terminal apparatus from the distribution path information table 112. Specifically, the packet generation unit 160 searches a record including the selected distribution path from the distribution path information table 112, and acquires the value of the item of effective bandwidth 1 of the searched record, as the effective bandwidth between the distribution apparatus 100 and the destination terminal apparatus.

(S774) The packet generation unit 160 calculates a threshold based on the effective bandwidth acquired in step S773 and on the unit playback time used in the video analysis information 121. The threshold is calculated by the formula "effective bandwidth acquired in step S773/(1/unit playback time)×correction value", for example. The correction value is set to a value larger than one, and is 1.3, for example. Note that a predetermined fixed value may be used as the threshold. In this case, the threshold is stored in a storage area on the video information storage unit 120, for example.

(S775) The packet generation unit 160 selects the i-th playback section from the head of the video data as the playback section to be processed. The initial value of the variable i is one.

(S776) The packet generation unit 160 refers to the information about the unit section included in the playback section selected in step S775 registered in the video analysis information 121. The packet generation unit 160 determines, based on the information about the unit section, whether two or more unit sections each having a data amount exceeding the threshold calculated in step S774 in the playback section to be processed are continuously present. When two or more unit sections each having the data amount exceeding the threshold are continuously present, the process is advanced to step S777. When two or more unit sections each having the data amount exceeding the threshold are not continuously present, the process is advanced to step S779.

(S777) The packet generation unit 160 determines the playback section selected in step S775 and the playback sections before and after the selected playback section as the playback sections to be adjusted.

(S778) The packet generation unit 160 adjusts, using the method described in FIGS. 11 to 12, the dividing position of the playback sections that have been determined as the target for adjustment in step S777. Then, the packet generation unit 160 calculates the information about the adjusted playback section, and updates the playback section information table 122 with the information about the calculated playback section.

(S779) The packet generation unit 160 determines whether all the playback sections are already selected. When all the playback sections are already selected, the process is advanced to step S781. When there is an unselected playback section, the process is advanced to step S780.

(S780) The packet generation unit 160 increments the variable i by one. Then, the process is advanced to step S775.

FIG. 25 is the flowchart (continued) illustrating the example of the packet generation process.

(S781) The packet generation unit 160 divides the video data to be distributed, for each playback section registered in the playback section information table 122.

(S782) The packet generation unit 160 selects one video data divided in step S781.

(S783) The packet generation unit 160 acquires a time stamp of the video selected in step S782. The information indicative of the playback time of the starting point of the playback section at the time when the selected video is divided is set to the time stamp, for example.

(S784) The packet generation unit 160 generates a packet for distributing the video data selected in step S782, in accordance with the format described in FIGS. 14 to 15. In this case, a sequence number starting from any value is set to the sequence number of the RTP header, and the time stamp calculated in step S782 is set to the time stamp of the RTP header. The selected video data is set to the RTP payload.

(S785) The packet generation unit 160 determines whether all pieces of the video data divided in step S781 are already selected. When all pieces of the video data are already selected, the process is terminated. When there is an unselected video data, the process is advanced to step S782.

Figure 26:
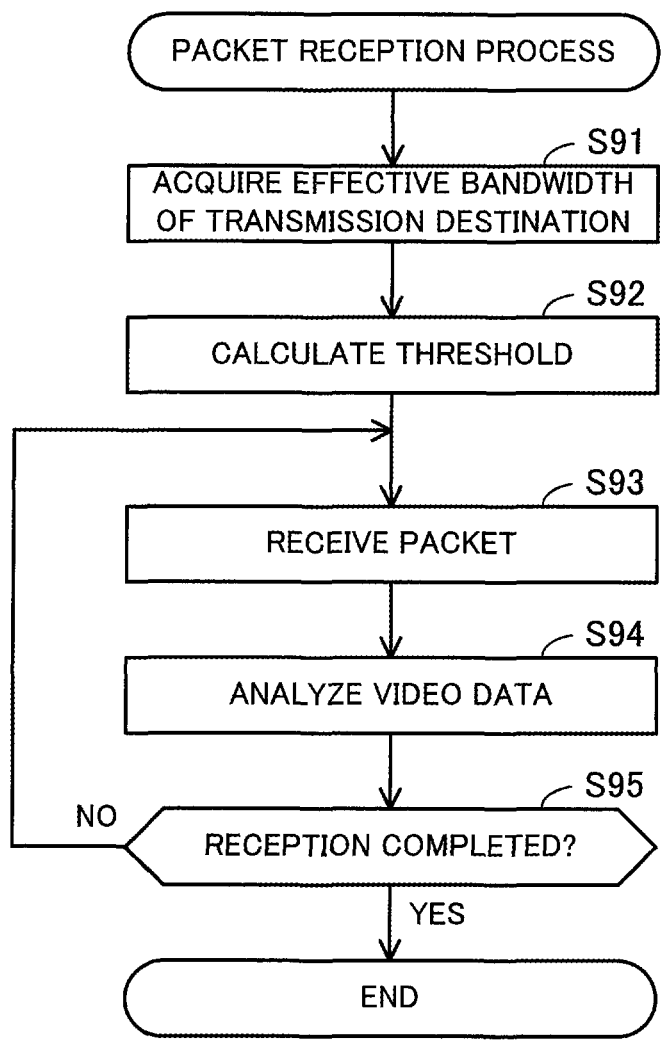
FIG. 26 is a flowchart illustrating an example of a packet reception process.

FIG. 26 is a flowchart illustrating an example of a packet reception process. The process described using FIG. 26 is executed by the terminal apparatus 200 that transfers received video data to another terminal apparatus. Hereinafter, the process illustrated in FIG. 26 is described following the step number.

(S91) The packet regeneration unit 240 acquires the effective bandwidth between the terminal apparatus 200 and the destination terminal apparatus. As the effective bandwidth between the terminal apparatus 200 and the destination terminal apparatus, the effective bandwidth measured by the method of step S24 in FIG. 19 or the like is used.

(S92) The packet regeneration unit 240 calculates, based on the effective bandwidth acquired in step S91 and the unit playback time, a threshold by a method similar to the method of step S774 in FIG. 24. The unit playback time is the same value as the unit playback time used by the distribution apparatus 100, and for example is stored in advance in a storage area secured in a storage device included in the terminal apparatus 200.

(S93) The packet reception unit 230 receives a packet from the distribution apparatus 100 or another terminal apparatus. The packet reception unit 230 stores the received packet in the transmission buffer.

(S94) The packet regeneration unit 240 analyzes the video data in the packet received in step S93, and acquires the playback data amount for each unit section. The packet regeneration unit 240 registers the acquired playback data amount for each unit section into the video analysis information of the management information storage unit 110.

(S95) The packet reception unit 230 determines whether the reception of all the packets of the video data to be distributed is completed. When the reception is not completed yet, the process is advanced to step S93. In this case, the packet reception unit 230 waits for the reception of the next packet. On the other hand, when the reception is completed, the process is terminated.

Note that, although not illustrated, every time the packet transmission unit 250 receives a packet request from another destination terminal apparatus, it transmits a head packet in the transmission buffer to the other terminal apparatus. Once a packet is transmitted, this packet is deleted from the transmission buffer.

Figure 27:
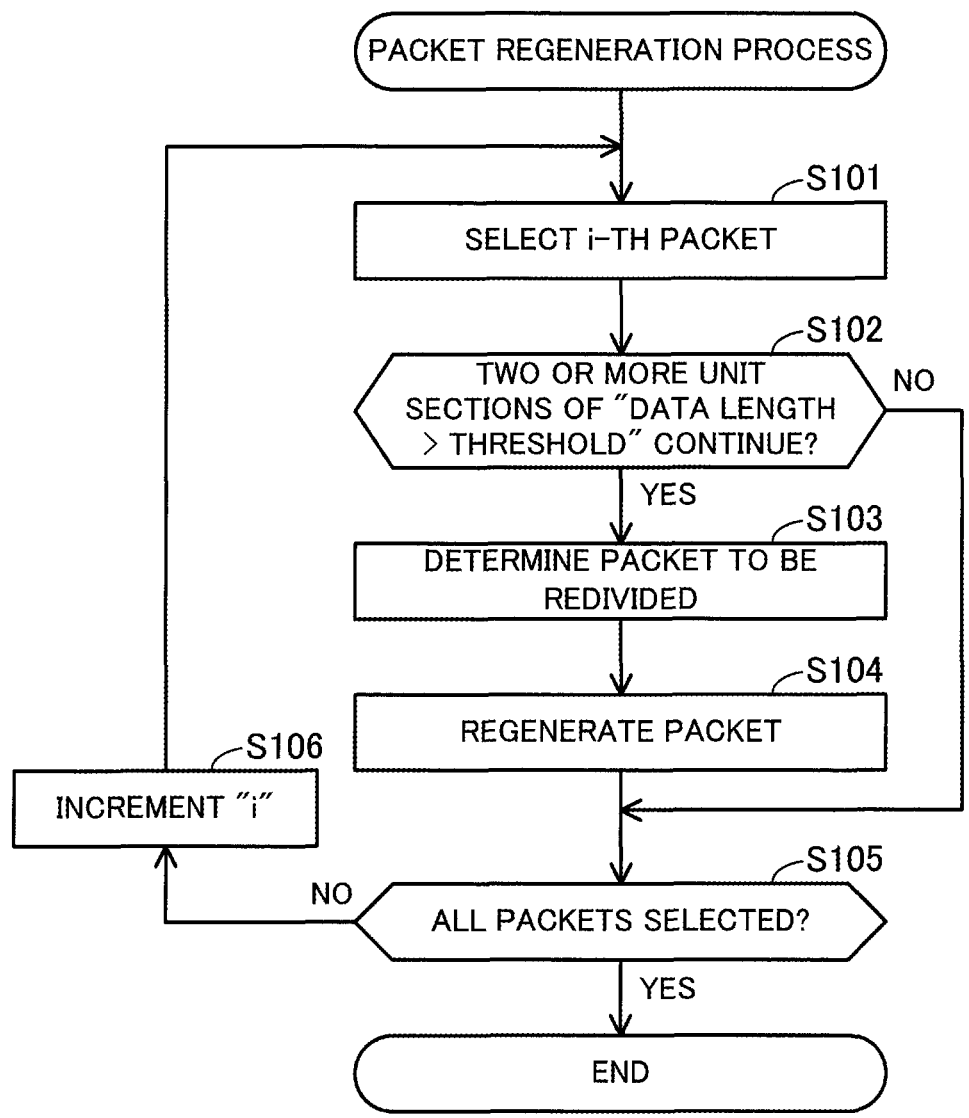
FIG. 27 is a flowchart illustrating an example of a packet regeneration process.

FIG. 27 is a flowchart illustrating an example of a packet regeneration process. The process of FIG. 27 is executed by the same terminal apparatus 200 in parallel with the process of FIG. 26. Hereinafter, the process illustrated in FIG. 27 is described following the step number.

(S101) Each packet to be stored in the transmission buffer is managed by a serial number that is appended from the reception start of the video data. The packet regeneration unit 240 selects the i-th packet as the packet to be processed. The initial value of the variable i is one.

(S102) The packet regeneration unit 240 refers to the information about the unit section included in the video data in the packet selected in step S101, among pieces of the video analysis information of the management information storage unit 270. The packet regeneration unit 240 determines, based on the information about the unit section, whether two or more unit sections each having the data amount exceeding the threshold calculated in step S92 are continuously present in the video data in a packet to be processed. When two or more unit sections each having the data amount exceeding the threshold are continuously present, the process is advanced to step S103. When two or more unit sections each having the data amount exceeding the threshold are not continuously present, the process is advanced to step S105. In the latter case, the packet to be processed remains in the transmission buffer as it is.

(S103) The packet regeneration unit 240 determines the packet selected in step S101 and the packets before and after the selected packet among the packets in the transmission buffer, as the packets to be redivided.

Note that, when there is no packet before the packet to be processed in the transmission buffer (e.g., when the previous packet is already transmitted), the packet to be processed and the subsequent packet are the packets to be redivided. Moreover, when there is no packet after the packet to be processed in the transmission buffer (e.g., when the packet to be processed is the final packet), the packet to be processed and the previous packet are the packets to be redivided.

(S104) The packet regeneration unit 240 combines the video data in the packet set as the target for redivision in step S103. The packet regeneration unit 240 redivides the combined video data in a manner similar to step S778 in FIG. 24, based on the information of the effective bandwidth acquired in step S91 of FIG. 26 and on the video analysis information of the management information storage unit 270.

That is, the packet regeneration unit 240 sets a playback section for the combined video data so that the playback data amount of the playback section becomes not more than the data amount that may be transmitted within the playback time of the playback section. Then, the packet regeneration unit 240 stores the video data for each set playback section in an individual packet, thereby regenerating a packet. The packet regeneration unit 240 replaces a packet that is stored in the transmission buffer and is set as the target for redivision in step S103, with the regenerated packet.

(S105) The packet regeneration unit 240 determines whether all the packets of the video data to be distributed are already selected as the packets to be processed. When they are not selected yet, the process is advanced to step S106. When they are already selected, the process is terminated.

(S106) The packet regeneration unit 240 increments the variable i by one. Then, the process is advanced to step S101.

According to the data distribution system 1 of the second embodiment described above, in distributing a packetized video using a distribution path connected in a daisy chain fashion, each terminal apparatus on the distribution path re-packetizes the video data, based on the effective bandwidth between the each terminal apparatus and another terminal apparatus of the transfer destination and on the data amount of each unit section data included in each divided video. This may reduce the risks of the drop-off and/or delay of a packet occurring in transferring the packetized video data. Accordingly, each terminal apparatus of a transfer destination may continuously playback the distributed video.

Moreover, by distributing a video using a distribution path connected in a daisy chain fashion, a processing load will concentrate neither on a distribution apparatus nor on one terminal apparatus in distributing the video, so that the risks of the drop-off and/or delay of a packet may be reduced.

Moreover, each terminal apparatus on the distribution path determines a video to be re-packetized among the videos included in a plurality of received packets, based on the effective bandwidth between the each terminal apparatus and another terminal apparatus of a transfer destination and on the data amount of each unit section data included in each divided video. Thus, only the needed part in video data will be re-packetized and the processing load on each terminal apparatus that transfers the video data will decrease.

Moreover, the distribution apparatus 100 acquires the effective bandwidth between the distribution apparatus 100 and each terminal apparatus and the effective bandwidths between the terminal apparatuses, and determines a distribution path in a daisy chain fashion based on the acquired effective bandwidths. Thus, video data may be distributed on a distribution path having a high communication quality, and therefore the occurrence of the risks of the drop-off and/or delay of a packet on a distribution path during the distribution of video data may be suppressed.

Moreover, the distribution apparatus 100 transmits the information indicative of the determined distribution path to each terminal apparatus serving as the distribution destination of a video. Thus, each terminal apparatus serving as the distribution destination of the video may recognize the transfer destination of a packetized video.

Note that, as previously described, the information processing of the first embodiment may be realized by causing the distribution apparatus 10 and/or the playback apparatuses 20a and 20b to execute programs, and the information processing of the second embodiment may be realized by causing the distribution apparatus 100, the terminal apparatuses 200, 200a and 200b, and 200c, and the authentication server 300 to execute programs. The programs may be recorded on computer readable recording media (e.g., the recording medium 53). A magnetic disc, an optical disc, a magneto-optical disc, a semiconductor memory, or the like may be used as the recording media, for example. The magnetic disc includes an FD and an HDD. The optical disc includes a CD, a CD-R (Recordable)/RW (Rewritable), a DVD, and a DVD-R/RW.

For the purpose of distributing computer programs, portable storage media containing the programs are provided, for example. Moreover, computer programs may be stored in a storage device of another computer and distributed to other computers via the network 30. For example, the computer stores the computer programs recorded on portable recording media or the computer programs received from other computers in a storage device (e.g., HDD 103), and reads the computer programs from the storage device and executes the same. However, the computer may directly execute the computer programs read from the portable recording media or may directly execute the computer programs received via the network 30 from other computers. Moreover, at least some of the above-described information processing may be realized by an electronic circuit, such as a DSP (Digital Signal Processor), an ASIC, or a PLD (Programmable Logic Device).

In one aspect, streaming data of a variable bit rate may be stably played back.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A distribution method in a distribution system, in which streaming data of a variable bit rate is packetized and distributed from a distribution apparatus to a plurality of playback apparatuses, the distribution method comprising:

receiving, by a first playback apparatus among the plurality of playback apparatuses, the streaming data included in packets from the distribution apparatus or a second playback apparatus among the plurality of playback apparatuses;

measuring, by the first playback apparatus, a communication quality between the first playback apparatus and a third playback apparatus among the plurality of playback apparatuses;

determining, by the first playback apparatus, whether to redivide the received streaming data included in the packets into other packets, based on a comparison between a playback data amount for each unit playback time about the streaming data included in the packets and a determination threshold based on the measured communication quality;

redividing, by the first playback apparatus, when it is determined to redivide the received streaming data included in the packets into the other packets, the received streaming data included in individual ones of the packets and in at least one of previous and next packets of the individual packets into a plurality of divided sections, the plurality of divided sections being determined so that the received streaming data included in one divided section is transmitted in a time not more than a playback time taken in playing back the received streaming data included in the one divided section;

storing, by the first playback apparatus, the received streaming data included in the plurality of divided sections in respective ones of the other packets;

transferring, by the first playback apparatus, the received streaming data in the other packets to the third playback apparatus; and playing back, by the first playback apparatus, the received streaming data.

2. The distribution method according to claim 1, further comprising, determining, by the distribution apparatus, a distribution path of the streaming data so that the streaming data is transferred in a daisy chain fashion among the plurality of playback apparatuses and all of the plurality of playback apparatuses are included on the distribution path, based on the communication quality between the distribution apparatus and each of the plurality of playback apparatuses and on the communication quality between every two of the plurality of playback apparatuses.

3. A playback apparatus which plays back streaming data, distributed from a distribution apparatus, of a variable bit rate in a packetized state, the playback apparatus comprising a processor configured to perform a procedure including:

receiving the streaming data included in packets from the distribution apparatus or a first other playback apparatus, measuring a communication quality between the playback apparatus and a second other playback apparatus;

determining whether to redivide the received streaming data included in the packets into other packets, based on a comparison between a playback data amount for each unit playback time about the streaming data included in the packets and a determination threshold based on the measured communication quality;

redividing, when it is determined to redivide the received streaming data included in the packets into the other packets, the received streaming data included in individual ones of the packets and in at least one of previous and next packets of the individual packets into a plurality of divided sections, the plurality of divided sections being determined so that the received streaming data included in one divided section is transmitted in a time not more than a playback time taken in playing back the received streaming data included in the one divided section;

storing the received streaming data included in the plurality of divided sections in respective ones of the other packets;

transferring the received streaming data in the other packets to the second other playback apparatus; and playing back the received streaming data.

* * * * *